US012677264B2

(12) United States Patent
    Gou et al.

(10) Patent No.: US 12,677,264 B2
(45) Date of Patent: Jul. 7, 2026

(54) FLEXIBLE SUBBAND CONFIGURATION AND USE METHOD AND DEVICE

(71) Applicant: ZTE CORPORATION, Shenzhen (CN)

(72) Inventors: Wei Gou, Shenzhen (CN); Xianghui Han, Shenzhen (CN); Xingguang Wei, Shenzhen (CN); Jing Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 337 days.

(21) Appl. No.: 18/522,079

(22) Filed: Nov. 28, 2023

(65) Prior Publication Data

US 2024/0147445 A1 May 2, 2024

Related U.S. Application Data

(63) Continuation of application No. PCT/CN2022/077856, filed on Feb. 25, 2022.

(51) Int. Cl.
| | |
|---|---|
| *H04W 72/04* | (2023.01) |
| *H04W 72/0446* | (2023.01) |
| *H04W 72/0453* | (2023.01) |
| *H04W 72/12* | (2023.01) |

(52) U.S. Cl.
CPC ... *H04W 72/0453* (2013.01); *H04W 72/0446* (2013.01); *H04W 72/12* (2013.01)

(58) Field of Classification Search
CPC .... H04L 5/0007; H04L 5/0053; H04W 72/04;
H04W 72/0446; H04W 72/0453; H04W 72/115; H04W 72/12; H04W 72/21; H04W 72/231; H04W 72/232
See application file for complete search history.

(56) References Cited

U.S. PATENT DOCUMENTS

| | | | |
|---|---|---|---|
| 11,937,235 B2 * | 3/2024 | Lei ........................ | H04W 80/02 |
| 2017/0215170 A1 | 7/2017 | Islam et al. | |
| 2018/0048435 A1 | 2/2018 | Islam et al. | |
| 2019/0090284 A1 | 3/2019 | Kang et al. | |
| 2019/0190751 A1 | 6/2019 | Nguyen et al. | |

(Continued)

FOREIGN PATENT DOCUMENTS

| | | |
|---|---|---|
| CN | 108632191 A | 10/2018 |
| WO | WO-2022/006342 A1 | 1/2022 |

OTHER PUBLICATIONS

Extended European Search Report for EP Appl. No. 22927745.4, dated Jul. 30, 2024 (7 pages).

(Continued)

*Primary Examiner* — Frank Duong
(74) *Attorney, Agent, or Firm* — Foley & Lardner LLP

(57) ABSTRACT

System, methods and apparatuses for flexible subband configuration can include a wireless communication node determining a configuration for flexible subband resources in frequency domain in one carrier or cell. The wireless communication node can send to a wireless communication device, the configuration. The configuration can indicate a time-frequency domain pattern of the flexible subband resources, the flexible subband resources comprising frequency domain resources in a plurality of symbols of at least one type of symbols.

20 Claims, 16 Drawing Sheets

(56)                    References Cited

U.S. PATENT DOCUMENTS

2022/0022183 A1 *   1/2022   Abdelghaffar ........ H04L 5/0044
2024/0049202 A1 *   2/2024   Wu ................... H04W 72/0453

OTHER PUBLICATIONS

International Search Report and Written Opinion for PCT Appl. No.
PCT/CN2022/077856, mailed on Sep. 28, 2022 (7 pages).
VIVO, "Discussion on SRS enhancement", 3GPP TSG RAN WG1
103-e, R1-2007649, Nov. 13, 2020, e-Meeting (21 pages).

* cited by examiner

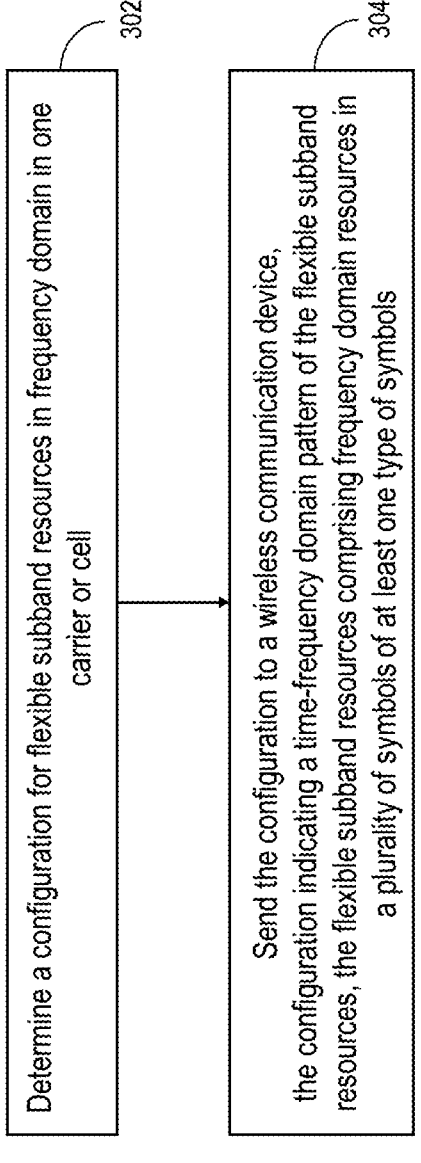

300

302

Determine a configuration for flexible subband resources in frequency domain in one carrier or cell

304

Send the configuration to a wireless communication device, the configuration indicating a time-frequency domain pattern of the flexible subband resources, the flexible subband resources comprising frequency domain resources in a plurality of symbols of at least one type of symbols

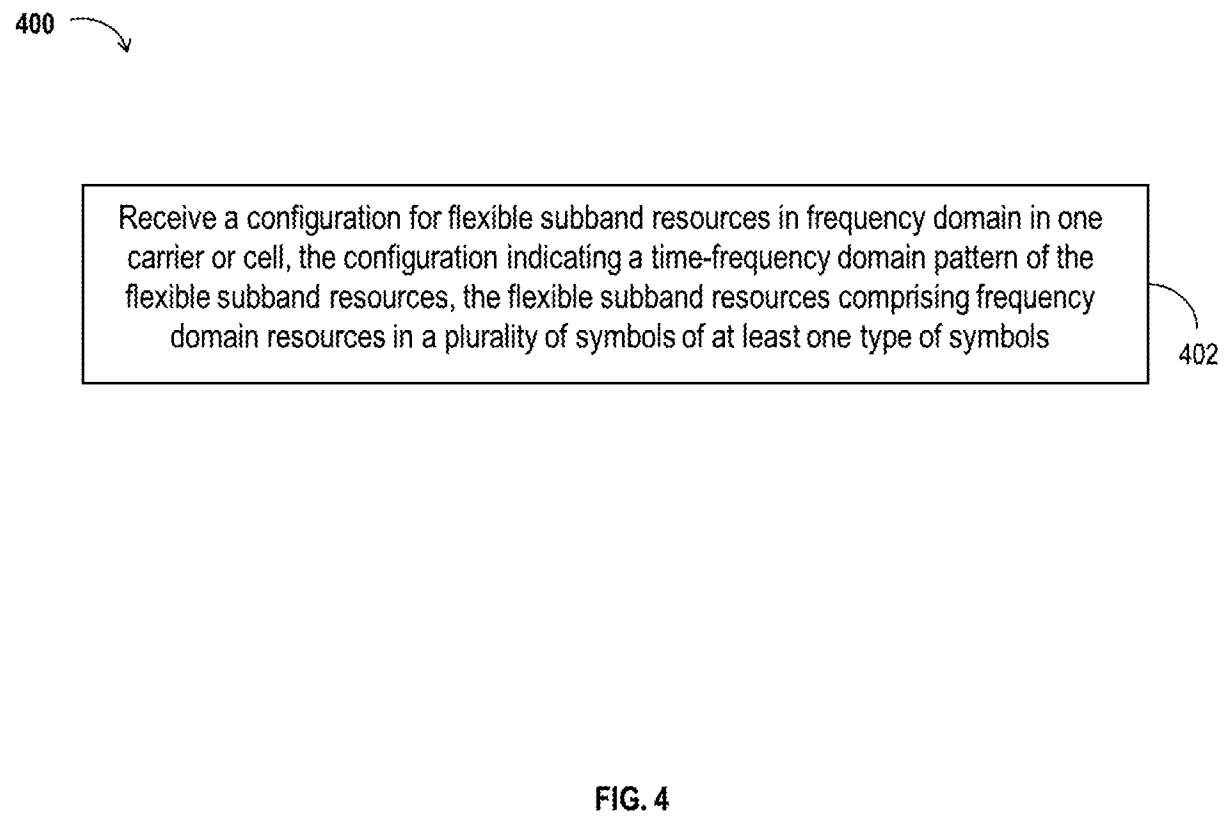

Receive a configuration for flexible subband resources in frequency domain in one carrier or cell, the configuration indicating a time-frequency domain pattern of the flexible subband resources, the flexible subband resources comprising frequency domain resources in a plurality of symbols of at least one type of symbols

FIG. 4

Uplink symbols

Flexible symbols

Downlink symbols

700b

Flexible subband resources

704 t f

FLEXIBLE SUBBAND CONFIGURATION AND USE METHOD AND DEVICE

CROSS-REFERENCE TO RELATED APPLICATION

This application claims the benefit of priority under 35 U.S.C. § 120 as a continuation of PCT Patent Application No. PCT/CN2022/077856, filed on Feb. 25, 2022, the disclosure of which is incorporated herein by reference in its entirety.

TECHNICAL FIELD

The disclosure relates generally to wireless communications, including but not limited to systems and methods for flexible subband configuration.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems associated with data transmission in wireless communication systems, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication node may determine a configuration for flexible subband resources in frequency domain in one carrier or cell. The wireless communication node may send, to a wireless communication device, the configuration. The configuration can indicate a time-frequency domain pattern of the flexible subband resources, the flexible subband resources comprising frequency domain resources in a plurality of symbols of at least one type of symbols.

The wireless communication node can send, to the wireless communication device, the configuration via at least one signaling. The configuration can indicate a number of symbols occupied by the flexible subband resources, and positions of the symbols occupied by the flexible subband resources. At least one of the flexible subband resources can be used for downlink transmission or uplink transmission, according to at least one of a first condition or a first scheduling, or may not be used for downlink transmission or uplink transmission, according to at least one of a second condition or a second scheduling.

The wireless communication node can configure a first flexible subband resource of the flexible subband resources in a time domain slot. The time domain slot can comprise one of a first flexible subband resource of the flexible subband resources in a time domain slot. The time domain slot can comprise one of a slot consisting of one or more downlink symbols, a slot consisting of one or more uplink symbols, a slot consisting of one or more flexible symbols, a slot consisting of one or more downlink symbols and one or more uplink symbols, or a slot comprising at least one of: a downlink symbol, an uplink symbol or a flexible symbol.

The time-frequency domain pattern of the flexible subband resources, in a first period comprising at least one slot, can be one of same as a time-frequency domain pattern of the flexible subband resources in a second period, or different from the time-frequency domain pattern of the flexible subband resources in the second period. The wireless communication node can configure a bandwidth of the flexible subband resources to be same as a bandwidth of one carrier or cell. The wireless communication node can configure at least one of the flexible subband resources to be positioned between at least one uplink resource on one side in frequency domain, and at least one downlink resource on another side in the frequency domain. The wireless communication node can configure the flexible subband resources based on at least one of a downlink symbol, an uplink symbol or a flexible symbol.

The wireless communication node can configure the flexible subband resources in consecutive or non-consecutive symbols of a slot. The wireless communication node can configure the flexible subband resources to occupy a same frequency domain pattern in each of the consecutive or non-consecutive symbols. The wireless communication node can configure the flexible subband resources to be in the non-consecutive symbols, by skipping at least one symbols having at least one property. The at least one symbol having the at least one property can comprise one of at least one symbol that is each an uplink symbol, at least one symbol that is each a downlink symbol, at least one symbol that is each a flexible symbol, at least one symbol that is each an uplink or downlink symbol, at least one symbol that is each a downlink or flexible symbol, at least one symbol that is each an uplink or flexible symbol or at least one symbol that is reserved or used for one or more specific transmissions.

The wireless communication node can configure the flexible subband resources to be in all or a portion of: downlink symbols, uplink symbols, or flexible symbols, in a slot. The configuration can be for a cell and can apply to wireless communication devices of the cell. The configuration can be specific to the wireless communication device. The wireless communication node can configure another configuration for flexible subband resources that are same as the flexible subband resources of the configuration. The another configuration can be specific to another wireless communication device. The wireless communication node can send, to the another wireless communication device, the another configuration.

The wireless communication node can schedule downlink transmission of a signal or channel that is common to one or more wireless communication devices, using the flexible subband resources. The wireless communication node can determine not to transmit downlink scheduled data that is specific to the wireless communication device, using the flexible subband resources. The wireless communication node can schedule the downlink transmission of the signal or channel to one or more wireless communication devices using at least one resource of the flexible subband resources. The at least one resource can be in at least one of a downlink symbol, a flexible symbol, or an uplink symbol.

The wireless communication node can schedule transmission of a semi-persistent scheduling (SPS) downlink channel, using the flexible subband resources, and transmit to the wireless communication device a SPS configuration via radio resource control (RRC) signaling using the flexible subband resources. The wireless communication node can determine to transmit downlink scheduled data that is specific to the wireless communication device, using the flexible subband resources. The wireless communication node can determine not to schedule downlink transmission of a signal or channel that is common to one or more wireless communication devices, using the flexible subband resources. The wireless communication node can determine to schedule or transmit downlink scheduled data that is specific to the wireless communication device and a signal or channel that is common to one or more wireless communication devices, using the flexible subband resources.

The wireless communication node can determine not to schedule or transmit any downlink signal or channel, using the flexible subband resources. The wireless communication node can receive, from the wireless communication device, a signaling that is indicative of a capability of the wireless communication device to support downlink communication using the flexible subband resources. The wireless communication node can schedule uplink transmission of a signal or channel that is common to one or more wireless communication devices, using the flexible subband resources. The wireless communication node can determine not to transmit uplink scheduled data that is specific to the wireless communication device, using the flexible subband resources. The wireless communication node can schedule the uplink transmission of the signal or channel to one or more wireless communication devices, using at least one resource of the flexible subband resources. The at least one resource ca comprise at least one of an uplink symbol, a flexible symbol, or a downlink symbol.

The wireless communication node can schedule transmission of a semi-static configured grant (CG) uplink channel, using the flexible subband resources, and transmit to the wireless communication device a CG uplink channel configuration via radio resource control (RRC) signaling using the flexible subband resources. The wireless communication node can determine to transmit uplink scheduled data that is specific to the wireless communication device, using the flexible subband resources. The wireless communication node can determine not to schedule uplink transmission of a signal or channel that is common to one or more wireless communication devices, using the flexible subband resources.

The wireless communication node can determine to schedule or transmit uplink scheduled data that is specific to the wireless communication device, and a signal or channel that is common to one or more wireless communication devices, using the flexible subband resources. The wireless communication node can determine not to schedule or transmit any uplink signal or channel, using the flexible subband resources. The wireless communication node can receive, from the wireless communication device, a signaling that is indicative of a capability of the wireless communication device to support uplink communication using the flexible subband resources.

At least one aspect is directed to a system, method, apparatus, or a computer-readable medium. A wireless communication device may receive, from a wireless communication node, a configuration for flexible subband resources in frequency domain in one carrier or cell. The configuration can indicate a time-frequency domain pattern of the flexible subband resources. The flexible subband resources can comprise frequency domain resources in a plurality of symbols of at least one type of symbols.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 is a flowchart illustrating a method of flexible subband configuration performed by a network node, in accordance with some embodiments of the present disclosure;

FIG. 4 is a flowchart illustrating a method of flexible subband configuration performed by a wireless communication device, according to example embodiments of the current disclosure;

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
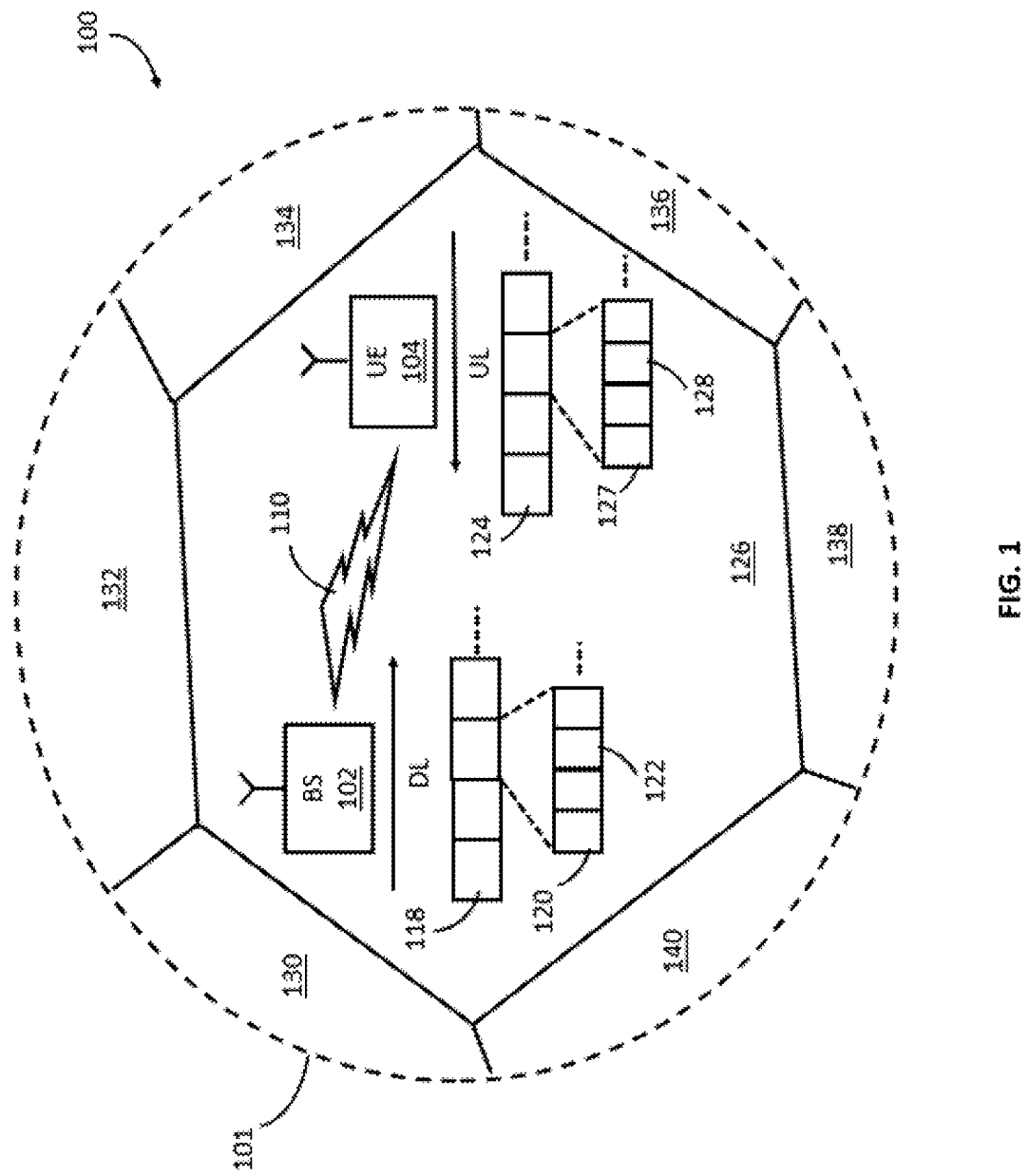
FIG. 1 illustrates an example cellular communication network in which techniques disclosed herein may be implemented, in accordance with an embodiment of the present disclosure.
Figure 2:
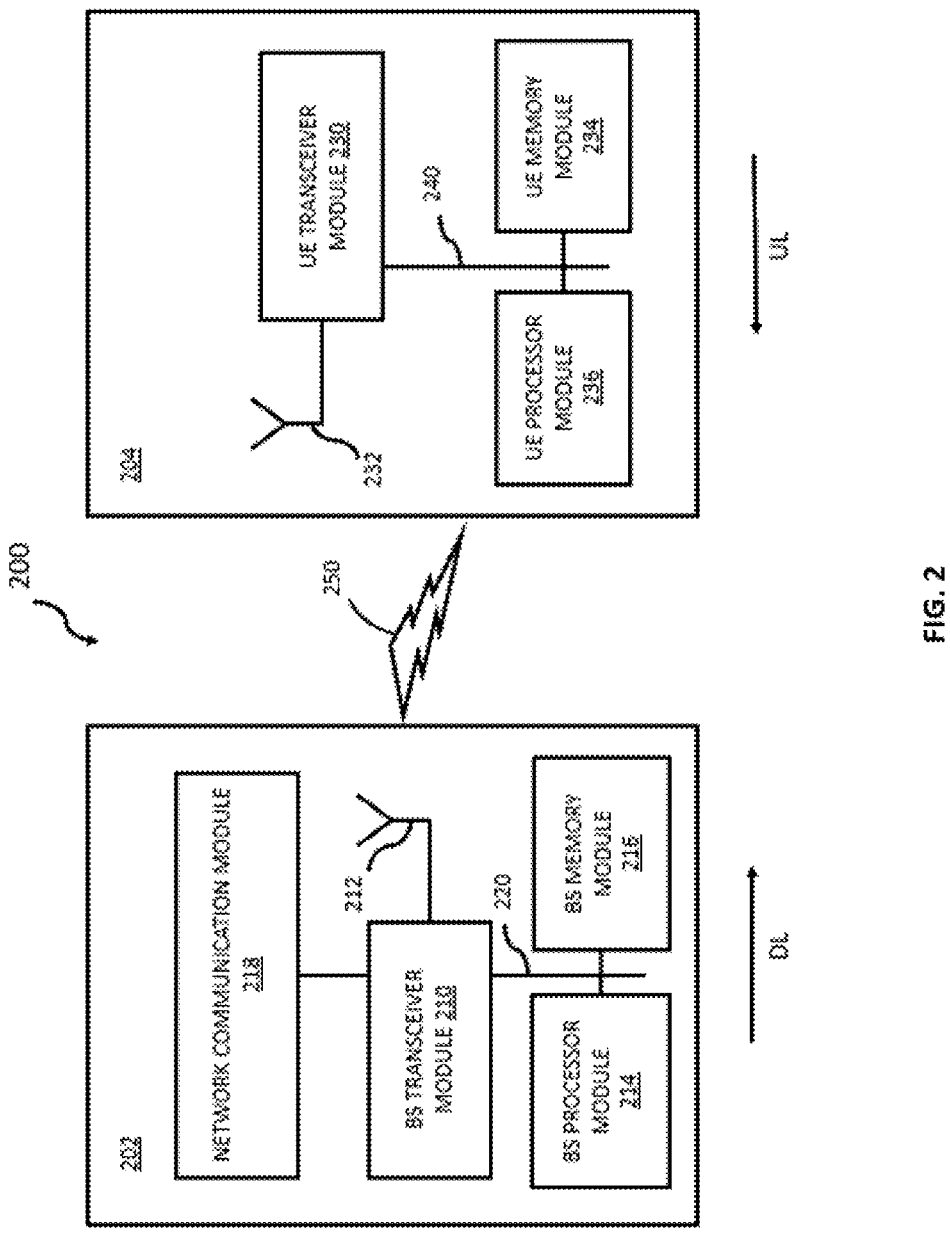
FIG. 2 illustrates a block diagram of an example base station and a user equipment device, in accordance with some embodiments of the present disclosure.

In wireless communication systems, such as systems 100 and 200 if FIGS. 1 and 2, time division duplex (TDD) spectrum resources are typically divided into downlink and uplink in the time domain in order to transmit uplink data and downlink data. For a TDD system, only uplink or downlink can be performed in each time period. Transmitting the uplink and downlink data simultaneously or at the same time period, where the frequency domain resources used by the uplink and the downlink are adjacent, generally leads to large interference between the uplink and the downlink. To avoid such interference, wireless communication systems can reserve a gap in the frequency domain between the uplink and the downlink. However, imposing such a gap reduces the system efficiency, in particular bandwidth usage efficiency.

To improve efficiency, e.g., bandwidth efficiency, TDD systems can support full duplex communications. The purpose is to enable the TDD system to support both uplink and downlink in each time period. However, supporting full duplex communications may lead to increased cost, especially for UE 204. To address the tradeoff between cost and efficiency, a compromise solution or approach can be adopted. For example, for a TDD system, the base station side can support full duplex communications, e.g., the base station 202 can support both uplink and downlink, while the UE side can support half duplex communications, e.g., the UE 204 still cannot support simultaneous uplink and downlink data transmissions. Such approach allows for maintaining a low UE cost and low complexity while at the same time improving the efficiency, e.g., bandwidth efficiency, of the TDD system.

In the current disclosure, various embodiments for configuring flexible subband resources in the frequency domain are described. The TDD system can use a flexible subband resource indirectly as a frequency gap, and/or to transmit uplink and/or downlink data. The configuration of flexible subband resources in the frequency domain, as discussed herein, allows for supporting full-duplex or half-duplex technology to improve system efficiency. The flexible subband resources also help reduce the interference between the uplink and the downlink.

A wireless network or abase station can schedule data transmission in flexible subbands according to an opportunistic scheme. For example, a flexible subband can be located in the frequency domain between a downlink subband and an uplink subband. If downlink transmissions are not scheduled in a slot or some symbols (e.g., OFDM symbols), then the base station or the network can schedule uplink transmissions in the flexible subband in that slot or in the symbols (e.g., OFDM symbols) where no downlink transmissions are scheduled. Also, if uplink transmissions are not scheduled in another slot or some other symbols (e.g., OFDM symbols), then the base station or the network can schedule downlink transmissions in the flexible subband in that slot or those other symbols (OFDM symbols) with no uplink transmissions scheduled. If both downlink transmissions and uplink transmissions are scheduled in a slot or in some symbols (e.g., OFDM symbols), then the base station or the network can avoid scheduling data transmissions in that slot or those symbols (e.g., OFDM symbols) having both uplink and downlink transmissions scheduled. In other words, no uplink transmissions will be scheduled within the flexible subband if they will align in time (e.g., will be simultaneous) with other downlink transmissions in the slot, and no downlink transmissions will be scheduled within the flexible subband if they will align in time (e.g., will be simultaneous) with other uplink transmissions in the slot. As such, the some of the frequency resources of the flexible subband can be used to schedule data transmissions without resulting in severe interference.

Compared with a frequency gap where no data transmissions are scheduled to avoid the interference between downlink and uplink transmissions, the flexible subband is more efficient and more flexible. The flexible subband allow for more efficient use of frequency resources since some of the frequency resources (e.g., some resource elements) of the flexible subband can be used to schedule data transmissions while in a frequency gap no data transmissions are scheduled. A flexible subband can provide multiple symbols or multiple options for scheduling a data transmission (e.g., a downlink transmission or an uplink transmission) or the flexible subband can be used as a frequency gap with no data transmissions scheduled therein. As such, flexible subbands provide more scheduling flexibility.

In the following, section 1 describes example wireless communication systems that can implement flexible subband resources. Section 2 describes various embodiments for configuring and implementing the flexible subband resources.

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node 102 or network node 102) and a user equipment device 104 (hereinafter "UE 104"; also referred to as wireless communication device 104) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 is also referred to herein as wireless communication node 202 or network node 202, and the UE 204 is also referred to herein as wireless communication device 204. The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Flexible Subband Configuration

Referring to FIG. 3, a flowchart illustrating a method 300 of flexible subband configuration is shown, in accordance with some embodiments of the present disclosure. The method 300 can be performed or executed by a network node, such as the wireless communication node 102 or 202. In brief overview, the method 300 can include the wireless communication node 102 or 202 determining a configuration for flexible subband resources in frequency domain in a carrier or cell (STEP 302). The method 300 can include the wireless communication node 102 or 202 transmitting the configuration to a wireless communication device, such as UE 104 or 204 (STEP 304). The configuration can indicate a time-frequency domain pattern of the flexible subband resources. The flexible subband resources can include frequency domain resources in or across a plurality of symbols of at least one type of symbols.

FIG. 4 is a flowchart illustrating a method 400 of flexible subband configuration from the perspective of a wireless communication device 104 or 204, according to example embodiments of the current disclosure. Specifically, the method 400 can include the wireless communication device 104 or 204 receiving a configuration for flexible subband resources in frequency domain in a carrier or cell (STEP

402). The configuration can indicate a time-frequency domain pattern of the flexible subband resources. The flexible subband resources can include frequency domain resources in or across a plurality of symbols of at least one type of symbols. The wireless communication device 104 or 204 can receive or transmit data over at least one of the flexible subband resources, e.g., according to the received configuration. For instance, the wireless communication device 104 or 204 can receive data over a flexible subband resource configured to be used for downlink transmission, or can transmit data over a flexible subband resource configured to be used for uplink transmission.

Referring back to FIG. 3, the method 300 can include the wireless communication node 102 or 202 determining a configuration for flexible subband resources in frequency domain in one carrier or cell (STEP 302). The wireless communication node 102 or 202 can configure a flexible subband resource as part of frequency domain resources in a carrier or cell. For example, the wireless communication node 102 or 202 can configure the flexible subband resource in units of resource blocks RB or subcarriers. The wireless communication node 102 or 202 can configure a flexible subband to contain continuous or discrete frequency domain resources. For instance, the wireless communication node 102 or 202 can configure a single flexible subband resource to occupy a continuous or discrete sub-block of resource elements within one or more resource blocks or one or more slots. The continuous or discrete sub-block of resource elements can run across multiple symbols, such as orthogonal frequency-division multiplexing (OFDM) symbols, and one or more subcarriers within the one or more resource blocks or the one or more slots. The wireless communication node 102 or 202 can configure multiple disconnected flexible subband resources within one or more resource blocks or within one or more slots, where each sub-block can run across multiple symbols, such as OFDM symbols, and one or more subcarriers within the resource block(s) or the slot(s).

In some implementations, the wireless communication node 102 or 202 can configure or designate a frequency subband within one or more slots as a flexible subband, and then configure or schedule one or more flexible subband resources within the flexible subband to be used either for downlink transmission or uplink transmission. For instance, the wireless communication node 102 or 202 can identify data symbols (e.g., OFDM symbols) which overlap with the flexible subband and which carry no downlink data transmissions. The wireless communication node 102 or 202 can designate or configure resources of the identified symbols within the flexible subband to be used for uplink transmission. The wireless communication node 102 or 202 can identify data symbols (e.g., OFDM symbols) which overlap with the flexible subband and which carry no uplink data transmissions. The wireless communication node 102 or 202 can designate or configure resources of such identified symbols within the flexible subband to be used for downlink transmission.

In other words, the wireless communication node 102 or 202 can configure or designate frequency resources within the flexible subband and that are associated with data symbols carrying no downlink transmissions to be used for uplink transmissions. The wireless communication node 102 or 202 can configure or designate frequency resources within the flexible subband and that are associated with data symbols carrying no uplink transmissions to be used for downlink transmissions. For frequency resources within the flexible subband and that are associated with data symbols carrying both uplink and downlink transmissions, the wireless communication node 102 or 202 can configure or designate such flexible subband resources not to be used neither for downlink transmissions nor for uplink transmissions. Such configuration allows for avoiding or mitigating interference e.g., between uplink and downlink transmissions.

The wireless communication node 102 or 202 may determine whether or not to configure or schedule a flexible subband in a resource block, slot, carrier or cell, for example, based on one or more factors or conditions. For instance, the wireless communication node 102 or 202 may determine not to configure or schedule a flexible subband in a given resource block, slot, carrier, cell. In a case where there is relatively large interference between uplink and downlink from different cells, the wireless communication node 102 or 202 can configure or schedule flexible subbands in different cells to alleviate the interference. For example, a flexible subband can be configured in two adjacent cells, cell-1 and cell-2, in frequency domain. In cell-1, downlink transmission can be scheduled in a higher frequency domain (or higher frequency subband with a lower frequency range) compared to the flexible subband. In cell-2, uplink transmission can be scheduled in a lower frequency domain (or a lower frequency subband with a lower frequency range) compared to the flexible subband.

In the case where the interference or the level of interference is acceptable, the wireless communication node 102 or 202 can decide not to configure a flexible subband. In some implementations, the wireless communication node 102 or 202 can configure or schedule a flexible subband, or flexible subband resources, as a cell common flexible subband (or cell common flexible subband resources), where the flexible subband or corresponding resources are common to all UEs in the same cell or different cells. That is, the flexible subband and/or corresponding resources are cell-specific. The wireless communication node 102 or 202 may or may not notify the wireless communication device 104 or 204 of the existence or scheduling of the flexible subband.

According to another example, if there is relatively large interference between the uplink and downlink of different wireless communications devices or UEs 104 or 204 from the same cell, the wireless communication node 102 or 202 can configure or schedule the flexible subband between the uplink and downlink of different wireless communications devices or UEs 104 or 204 in order to alleviate the interference.

The wireless communication node 102 or 202 can configure or scheduled a flexible subband for use as flexible resources. Referring back to FIGS. 3 and 4, at least one of the flexible subband resources can be used for downlink transmission or uplink transmission, according to at least one of a first condition or a first scheduling. According to at least one of a second condition or a second scheduling, the at least one of the flexible subband resources is not used for downlink transmission or uplink transmission. In particular, under some conditions or scheduling, some or all of the flexible subband resources can be used for downlink or uplink transmission. Under some other conditions, some or all of the flexible subband resources cannot be used for downlink transmission or uplink transmission. The wireless communication node 102 or 202 can configure or schedule the flexible subband as a guard interval between uplink and downlink. Alternatively, the wireless communication node 102 or 202 can configure or schedule the flexible subband to include a frequency gap. For instance, when the flexible subband is configured with large resources in the frequency domain, it is inefficient to use all the frequency domain resources of the flexible subband as a frequency gap. Instead, the wireless communication node 102 or 202 can configure or schedule a portion (or a subset of the frequency domain resources) of the flexible subband as a gap, and can configure or schedule the rest of the frequency domain resources in the flexible subband as downlink and/or uplink resources. As used herein, a gap represents a set of radio resources, e.g., a set of resource elements that are not used or allocated to transmit or receive data whether uplink or downlink.

Figure 5:
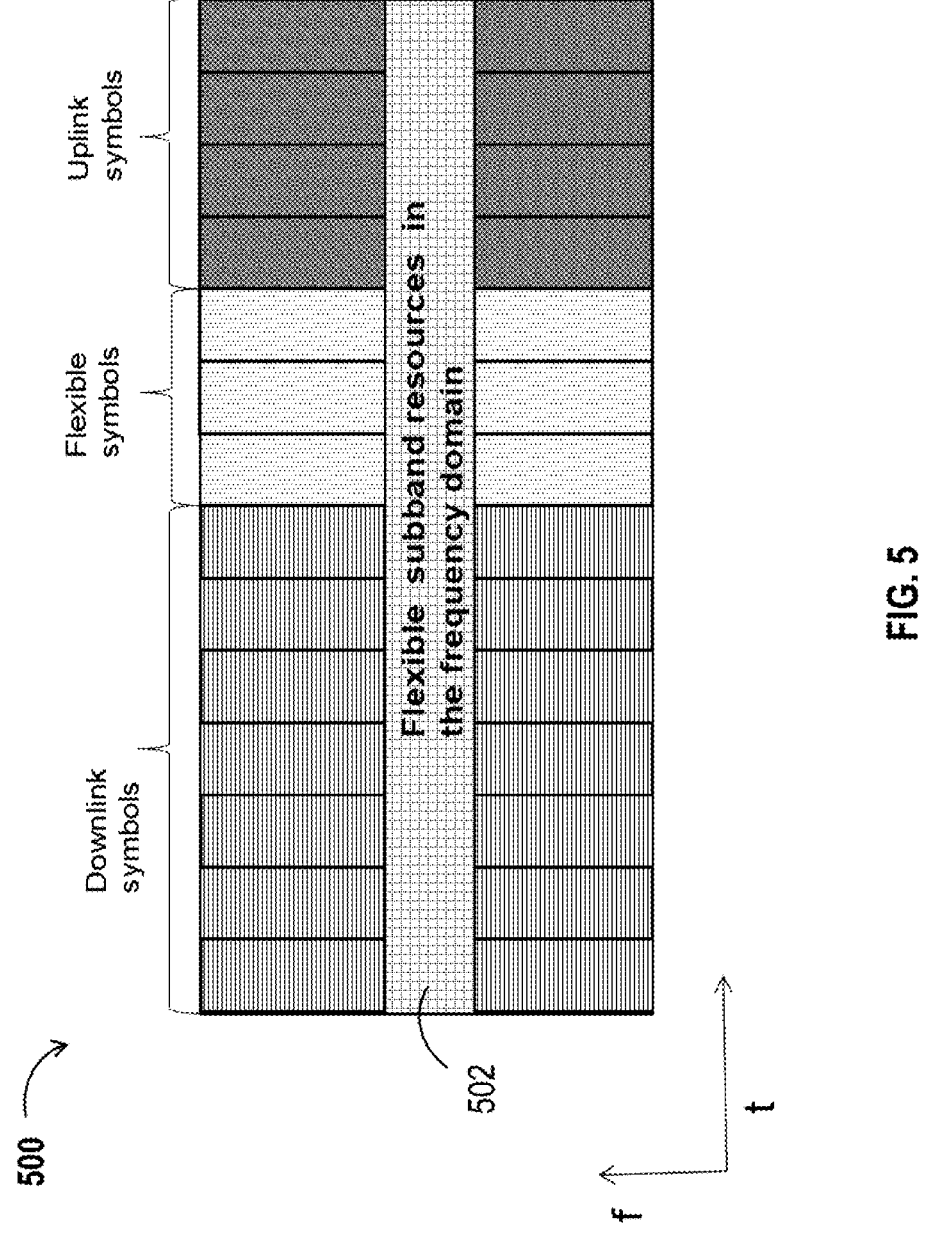
FIG. 5 shows a first example of a flexible subband configuration scheme, according to example embodiments of the current disclosure.

Referring now to FIG. 5, an example of a flexible subband configuration scheme 500 or time-frequency pattern 500 is shown, according to example embodiments of the current disclosure. The wireless communication node 102 or 202 can configure or schedule the flexible subband 502 as a frequency domain resource. The flexible subband 502 can span across (or can be contained in) downlink symbols, flexible symbols and uplink symbols. The wireless communication node 102 or 202 can configure or schedule the same frequency domain resources (e.g., same subcarriers) to be part of the flexible subband in all types of symbols. In other words, the flexible subband can occupy the same frequency domain resources across different types of symbols. The flexible subband can span across only downlink symbols, only uplink symbols, only flexible symbols, or across a combination of downlink symbols, uplink symbols and/or flexible symbols.

A time-frequency domain pattern of the flexible subband resources, in a first period comprising at least one slot, can be the same as a time-frequency domain pattern of the flexible subband resources in a second period, or can be different from the time-frequency domain pattern of the flexible subband resources in the second period. In other words, the flexible subband resources can be the same frequency domain resources across the time axis, or can change across the time axis. The frequency width of the time-frequency domain pattern can be constant or can vary over time (e.g., within one or more resource blocks).

The wireless communication node 102 or 202 can configure or schedule the flexible subband in slots where the OFDM symbols are all downlink symbols or uplink symbols. The wireless communication node 102 or 202 can configure or schedule the flexible subband in slots where the OFDM symbols are all flexible symbols. The wireless communication node 102 or 202 can also configure or schedule the flexible subband in slots that contain uplink symbols and downlink symbols. In the case where flexible subbands are configured in slots including downlink symbols, flexible symbols and/or uplink symbols, the wireless communication node 102 or 202 can configure the flexible subbands with different frequency positions and sizes within symbol of different types. The frequency positions and/or frequency width of the flexible subbands can change across symbols of different types.

The wireless communication node 102 or 202 can configure the flexible subbands with the same or different frequency positions and/or sizes (e.g., frequency width) across different slots. Alternatively, the wireless communication node 102 or 202 can configure the flexible subbands with the same frequency position and size (e.g., frequency width) in a time period including at least one slot. The wireless communication node 102 or 202 can configure the flexible subbands with different frequency positions and sizes (if required) in or across different periods.

In some implementations, the wireless communication node 102 or 202 can configure a bandwidth of the flexible subband resources to be the same as a bandwidth of one carrier or cell. In other words, the configured bandwidth of the flexible subband can be equal to the bandwidth of the cell or carrier. For example, the wireless communication node 102 or 202 can reserve the entire slot for a special purpose by configuring the flexible subband to have a bandwidth equal to the bandwidth of the cell or carrier. For example, if the wireless communication node 102 or 202 wants to transmit (or receive) some data to (or from) another network node or base station in a slot, the wireless communication node 102 or 202 can configure a flexible subband that occupies the entire bandwidth in the slot. Then, UEs 104 or 204 are not scheduled to transmit or receive data in this slot, and UEs will not transmit or receive data in this slot. Further, the UEs 104 or 204 will not receive the downlink reference signal in this slot for measurement since no reference signal is transmitted in the flexible subband if no data is scheduled in the flexible subband. The wireless communication node 102 or 202 can notify the other network node or base station to transmit or receive data within the slot.

The flexible subband configuration method described above in relation to FIGS. 3 and 4 facilitates configuring the flexible subband at any required time-frequency domain position, for example, to avoid interference between uplink and downlink.

The wireless communication node 102 or 202 can configure a first flexible subband resource of the flexible subband resources in a time domain slot. The time domain slot can include a slot consisting of one or more downlink symbols (e.g., having only downlink symbols), a slot consisting of one or more uplink symbols (e.g., only uplink symbols), a slot consisting of one or more flexible symbols (e.g., only flexible symbols), a slot consisting of one or more downlink symbols and one or more uplink symbols (e.g., a combination of downlink and uplink symbols), or a slot comprising at least one of a downlink symbol, an uplink symbol or a flexible symbol (e.g., combinations of uplink, downlink and/or flexible symbols).

Referring back to FIG. 5, the OFDM symbols in FIG. 5 can correspond to one slot (e.g., including 14 OFDM symbols). For one carrier, a subset of the frequency domain resources can be used for downlink (e.g., first seven OFDM symbols of the time-frequency pattern 500), and portion of the frequency domain resources in the downlink symbols can be configured as flexible subband resources (e.g., the portion of the flexible subband 502 within the first seven OFDM symbols). Another subset of the OFDM symbols in the slot can be used for uplink (e.g., last four symbols of the time-frequency pattern 500), and a portion of the frequency domain resources in the uplink symbols can be configured as flexible subband resources (for example, the portion of the flexible subband 502 within the last 4 OFDM symbols of time-frequency pattern 500). Another subset of the OFDM symbols in the slot can be used for flexible transmission (e.g., symbols 8-10 of the time-frequency pattern 500), and a portion of the frequency domain resources in these symbols can be configured as flexible subband resources (for example, the portion of the flexible subband 502 within the OFDM symbols 8-10 of time-frequency pattern 500). In general, the OFDM symbols included in the slot can be any combination of the three types of OFDM symbols in which the flexible subband 502 is configured.

One of the features of the new radio (NR) technology of fifth generation (5G) mobile communication systems is the support of high frequency bands. High frequency bands have abundant frequency domain resources. However, wireless signals in high frequency bands decay quickly resulting in relatively small coverage of the wireless signals. Thus, transmitting signals in a beam mode leads to concentrating energy in a relatively small spatial range and improving the coverage of the wireless signals in the high frequency bands. In the beam mode scenario, as the time and position change, a beam pair between a base station and a wireless communication device or UE 104 or 204 may also change. The change in the beam pair calls for a flexible beam update mechanism. Also, it is desired to have a mechanism to signal and/or update beam state for both uplink and downlink.

Figure 6:
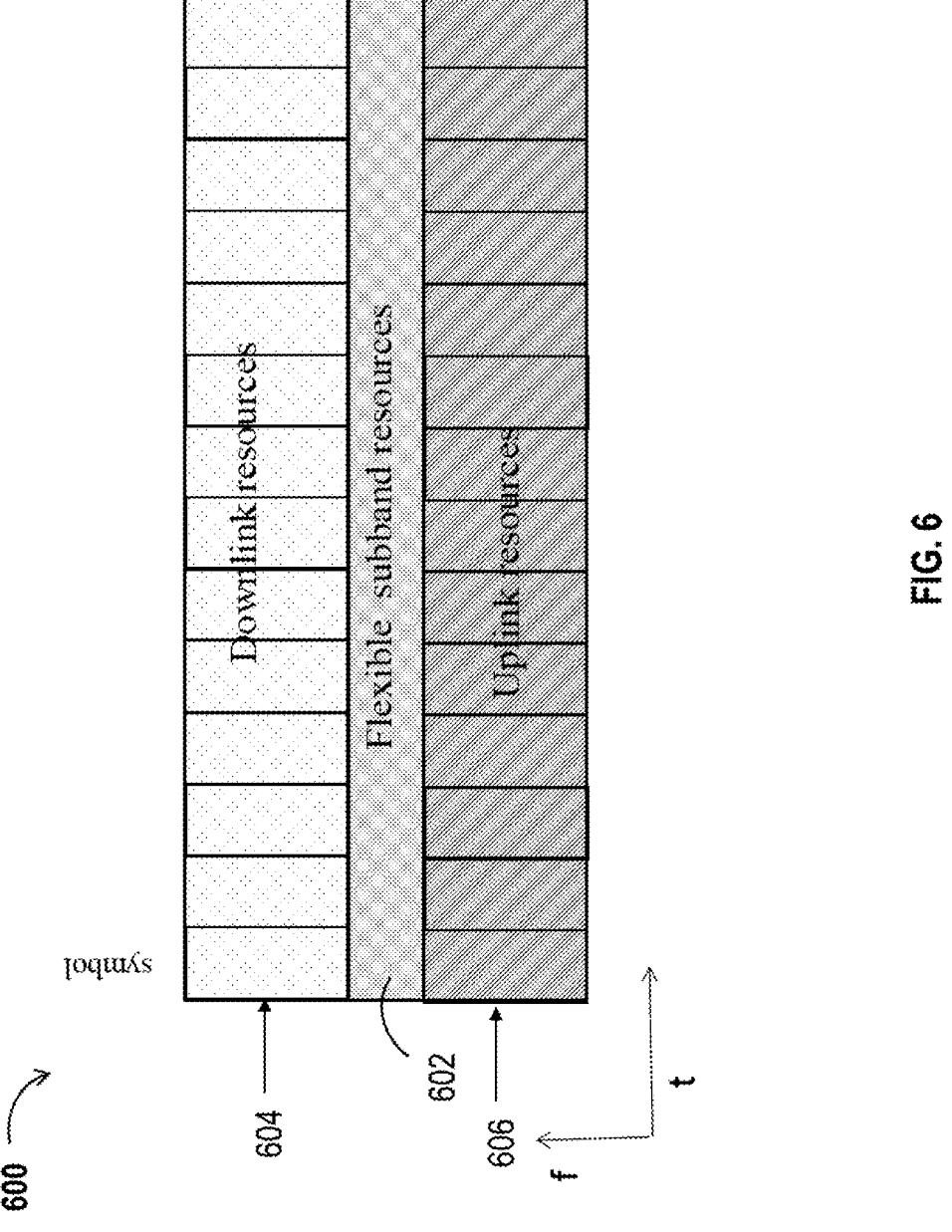
FIG. 6 shows a second example of a flexible subband configuration scheme, according to example embodiments of the current disclosure.

In some implementations, the wireless communication node 102 or 202 can configure at least one of the flexible subband resources to be positioned between at least one uplink resource on one side in frequency domain, and at least one downlink resource on another side in the frequency domain. Referring now to FIG. 6, another example of a flexible subband configuration scheme or time-frequency pattern 600 is shown, according to example embodiments of the current disclosure. The flexible subband 602 is positioned between downlink resources 604 and uplink resources 606, respectively. For example, for the frequency domain resources corresponding to one or more OFDM symbols in a carrier or cell, part of the frequency domain resources (e.g., region 604) can be used for the downlink, and part of the frequency domain resources (e.g., region 606) can be used for the uplink. The frequency domain resources 602 configured as flexible subband resources can be positioned between the downlink resources 604 and the uplink resource 606. In some implementations, for frequency domain resources corresponding to one or more symbols in a carrier, part of the frequency domain resources can be used for downlink and part of the frequency domain resources can be configured as F subband resources. In some other implementations, for frequency domain resources corresponding to one or more symbols in a carrier, part of the frequency domain resources is used for uplink, and part of the frequency domain resources can be configured as flexible subband resources.

In some implementations, the wireless communication node 102 or 202 can configure the flexible subband resources based on at least one of a downlink symbol, an uplink symbol or a flexible symbol. For instance, the wireless communication node 102 or 202 can convert portions of one or more downlink, uplink and/or flexible symbols in a slot or resource block into flexible subband resources. The wireless communication node 102 or 202 can configure flexible subband resources based on OFDM symbols. The OFDM symbols in which the F subbands are configured may be downlink symbols, uplink symbols, or flexible symbols, or may be a combination of multiple symbol types of symbols.

In some implementations, the wireless communication node 102 or 202 can configure the flexible subband resources in consecutive or non-consecutive symbols of a slot. The wireless communication node 102 or 202 can allocate the flexible subband in frequency portions of a subset of symbols in a slot. For example, a slot can include 14 OFDM symbols, and the wireless communication node 102 or 202 can configure the flexible subband(s) in any number of consecutive or non-consecutive symbols within the slot. The flexible subband(s) can have different frequency domain positions and/or sizes (e.g., frequency width) across different symbols.

In a slot, the wireless communication node 102 or 202 can configure flexible subband(s) to reside in consecutive or non-consecutive symbols. The flexible subband(s) can be configured to occupy the same frequency domain position and size in each symbol. The wireless communication node 102 or 202 can configure multiple flexible subbands in a slot. In some implementations, the wireless communication node 102 or 202 can configure the flexible subband resources to be located in non-consecutive symbols, by skipping (e.g., bypassing, not using or not including) at least one symbols having at least one property.

In some implementations, the wireless communication node 102 or 202 can configure the flexible subband resources to be in all or a portion (subset) of downlink symbols, uplink symbols, or flexible symbols, in a slot. Flexible subband(s) can be configured to reside in all or part of the downlink symbols, all or part of the uplink symbols, or all or part of the flexible symbols in the slot. The flexible subband(s) can be configured to occupy different types of symbols within the slot. The flexible subband(s) can be configured to skip some symbols in the slot.

Figure 7A:
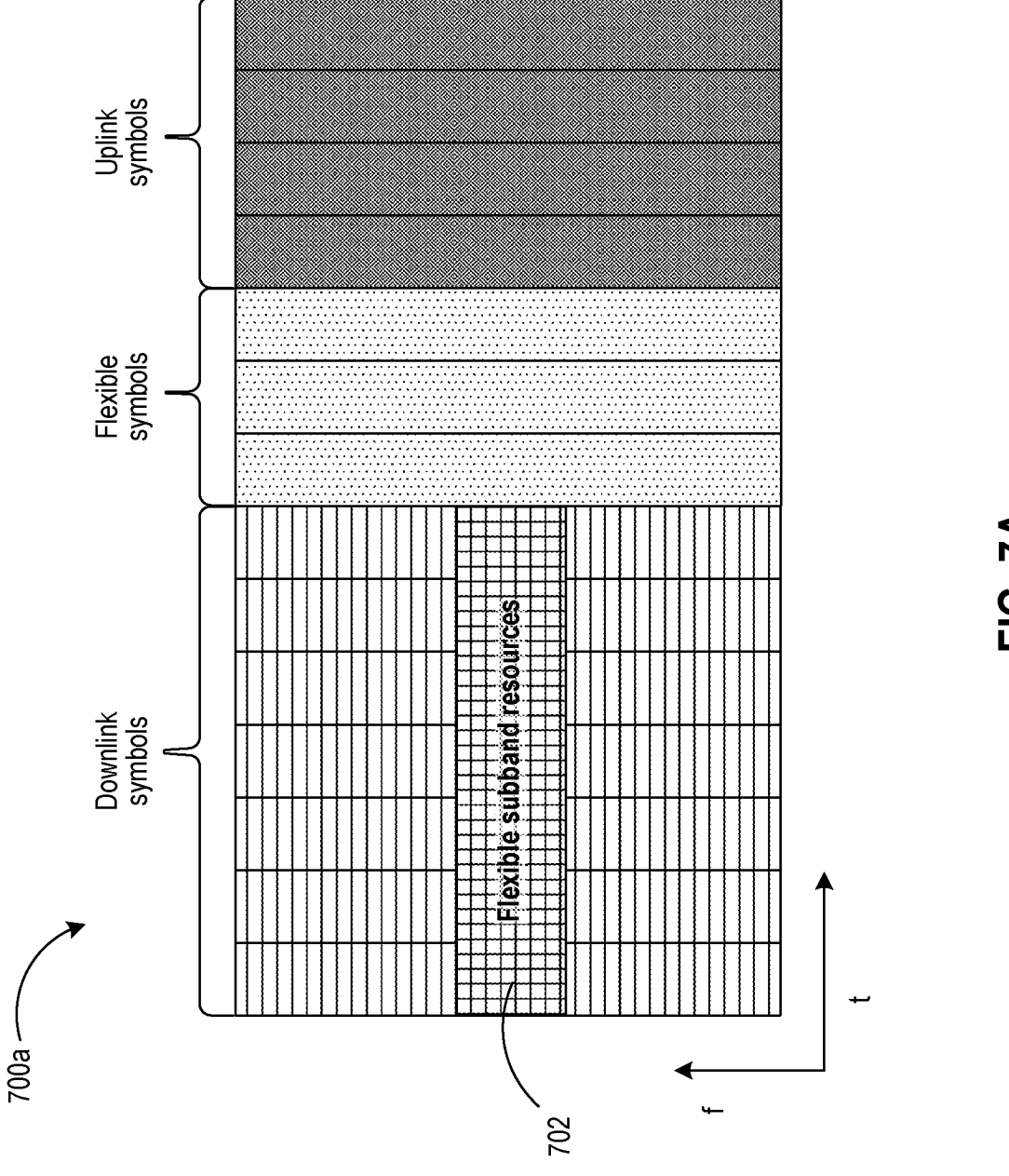
FIGS. 7A-7C shows other examples of flexible subband configuration schemes, according to example embodiments of the current disclosure.
Figure 7B:
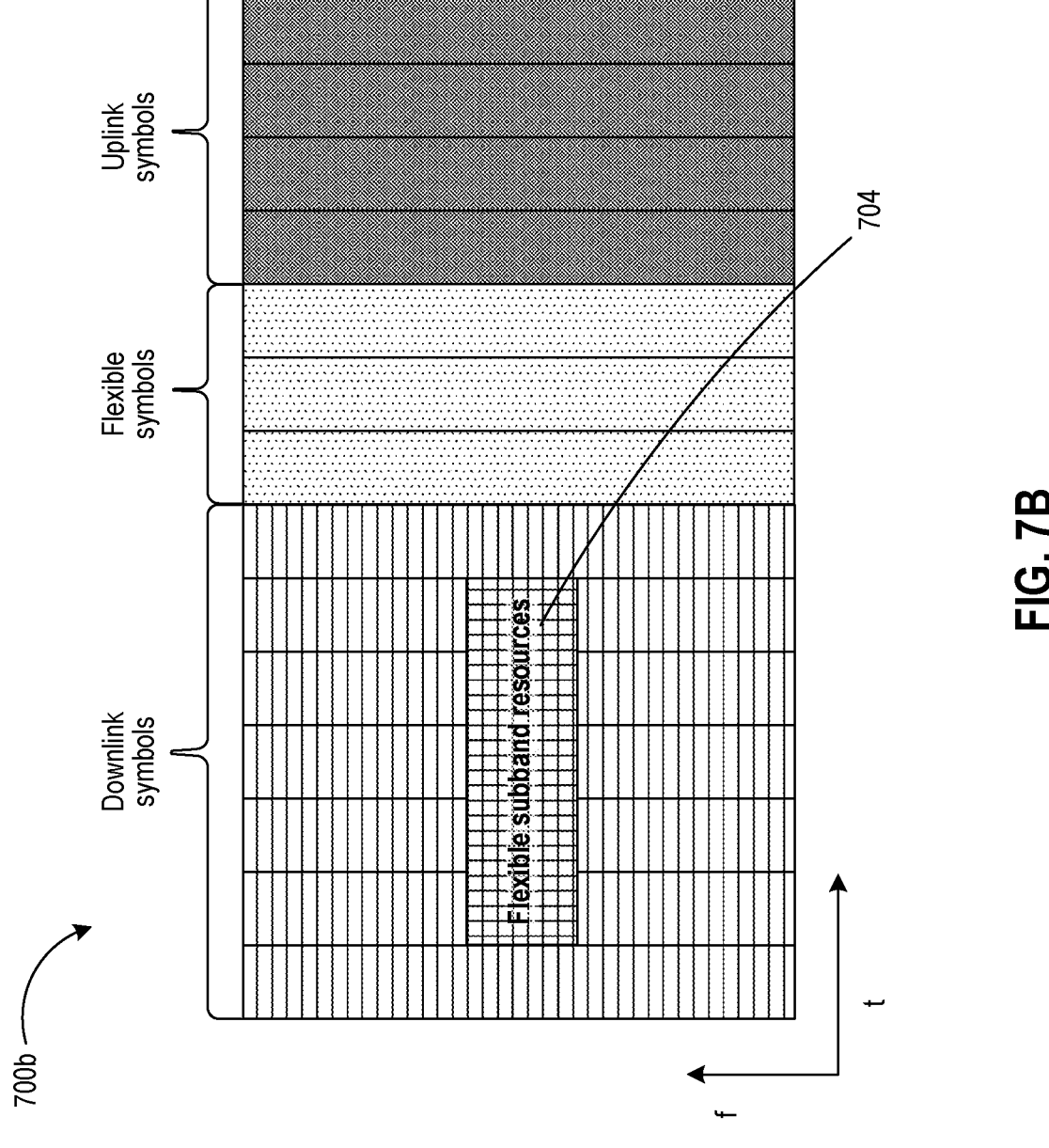
Figure 7C:
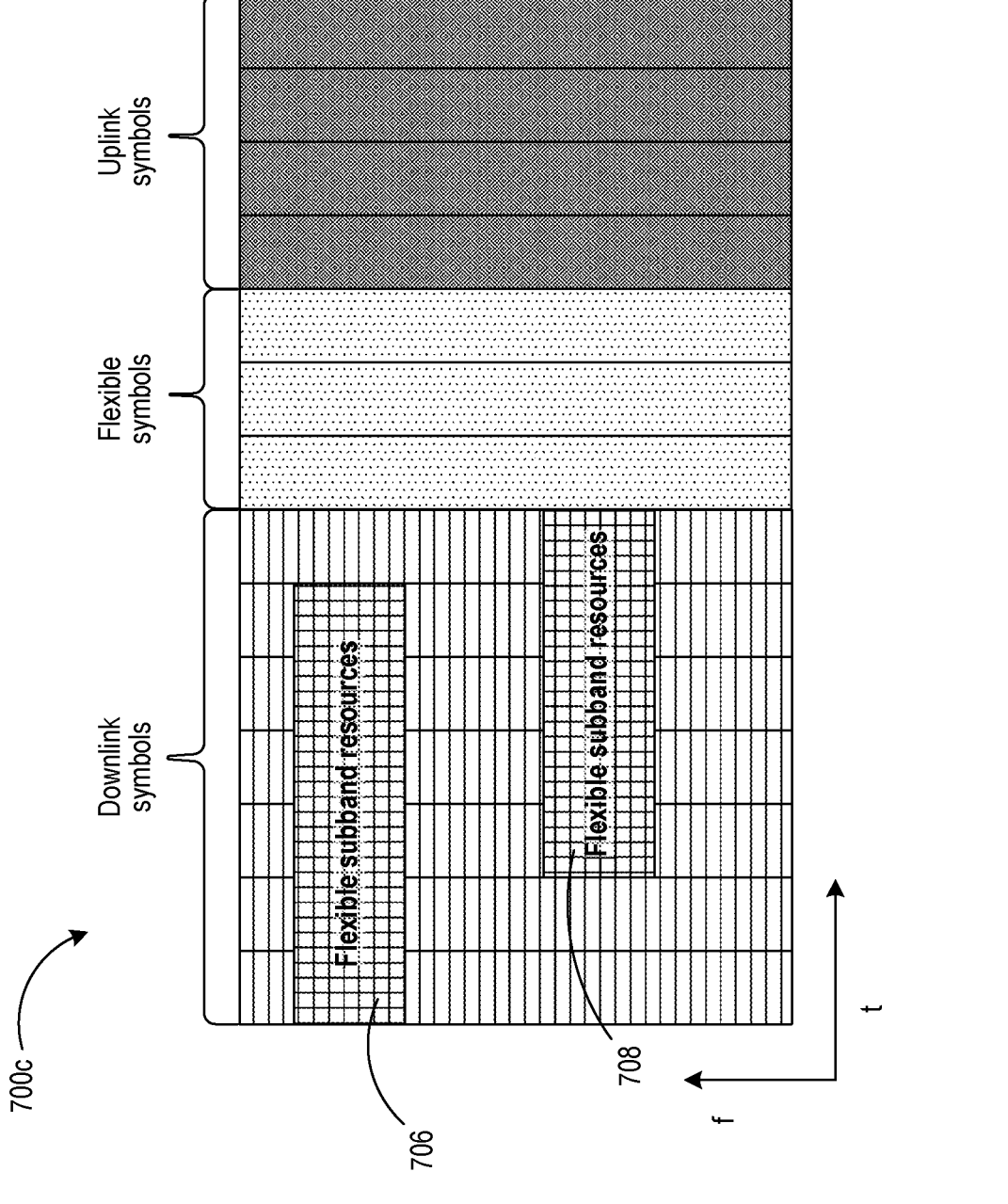

FIGS. 7A-7C, 8A-8C and 9A-9D depict other flexible subband configuration schemes or time-frequency patterns, according to example embodiments of the current disclosure. In FIG. 7A, the flexible subband (or flexible subband resource(s)) 702 occupies a frequency portion of all downlink symbols in the time-frequency pattern 700*a*. In FIG. 7B, the flexible subband (or flexible subband resource(s)) 704 occupies a frequency portion of a subset of the downlink symbols in the time-frequency pattern 700*b*. In FIG. 7C, the flexible subband (or flexible subband resource(s)) 706 occupies a first frequency portion of a first subset of the downlink symbols in the time-frequency pattern 700*c*, while the flexible subband (or flexible subband resource(s)) 708 occupies a second frequency portion of a second subset of the downlink symbols in the time-frequency pattern 700*c*. The frequency positions and the sizes of the flexible subbands 706 and 708 are different.

Figure 8A:
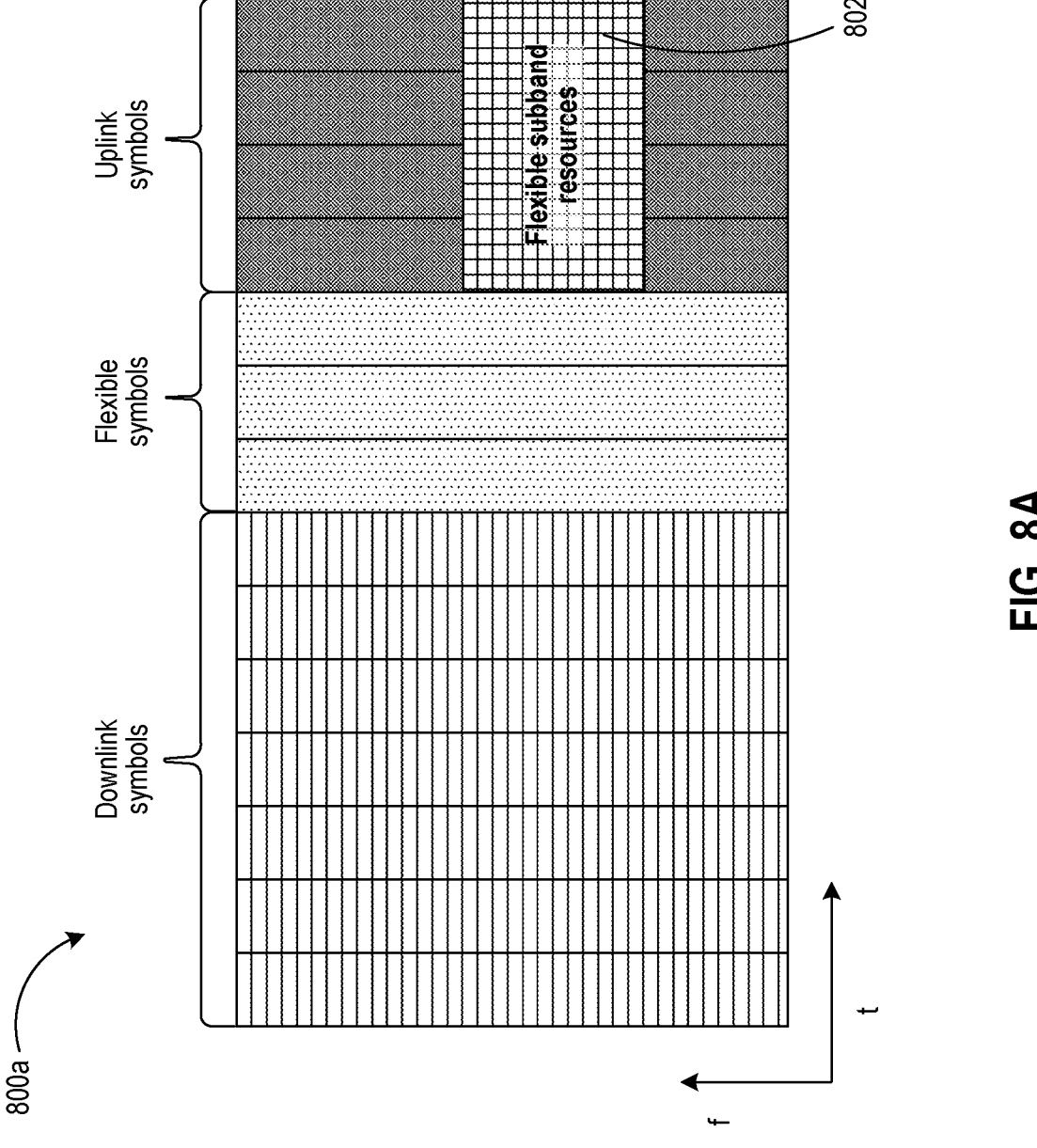
FIGS. 8A-8C shows other examples of flexible subband configuration schemes, according to example embodiments of the current disclosure.
Figure 8B:
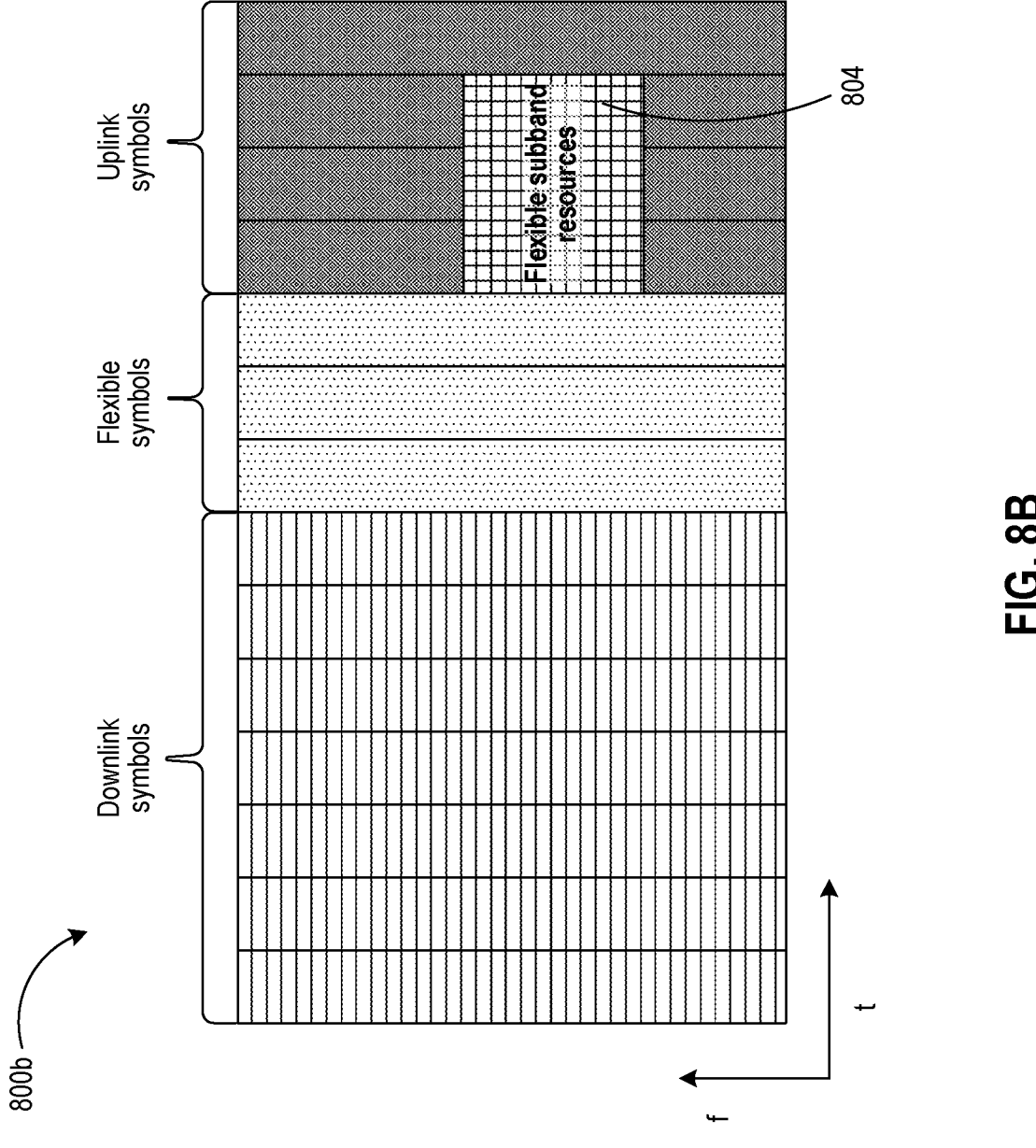
Figure 8C:
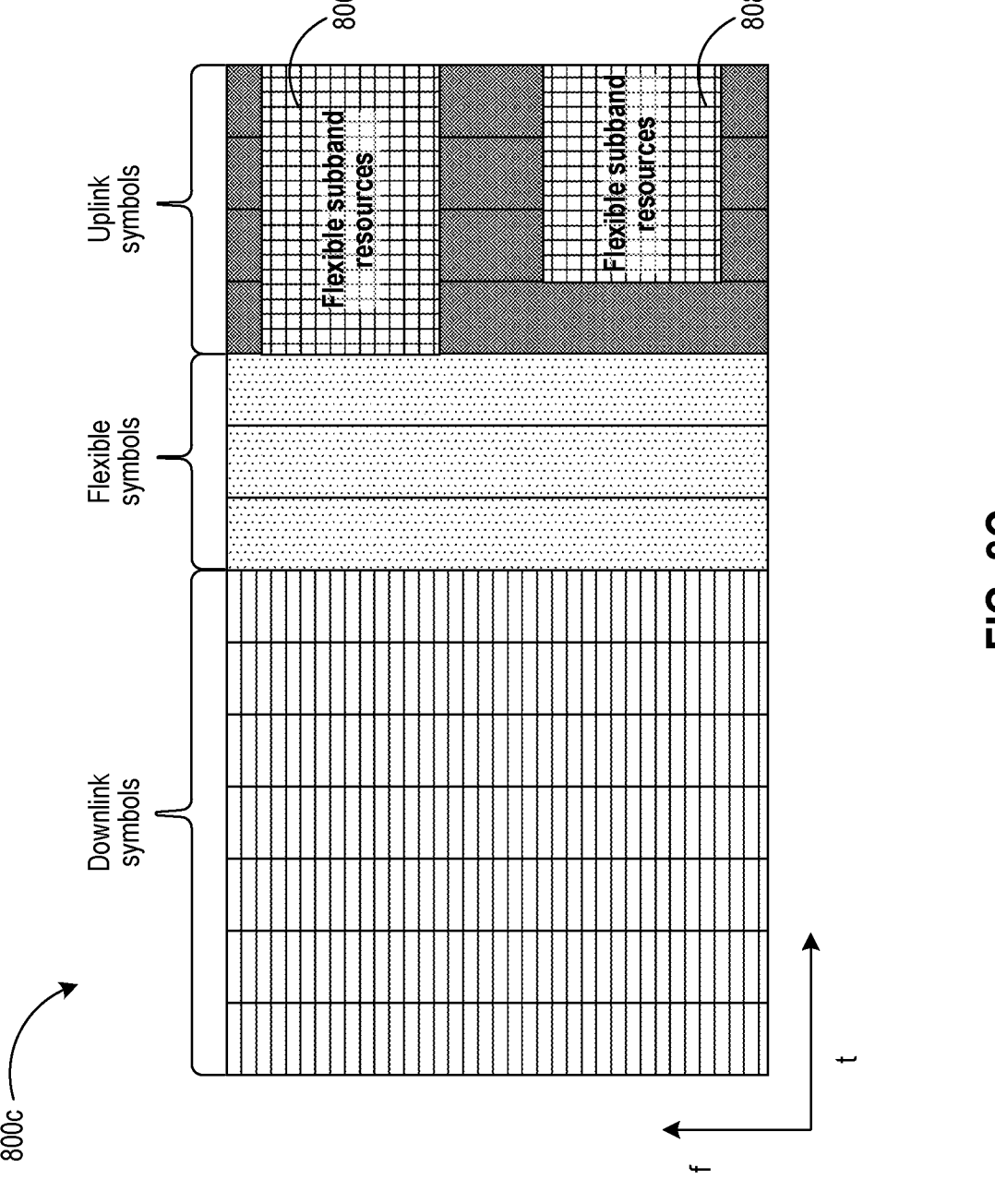

In FIGS. 8A-8C, the flexible subbands 802, 804, 806 and 808 reside in uplink symbols of the slot. The flexible subband (or flexible subband resource(s)) 802 occupies a frequency portion of all uplink symbols in the time-frequency pattern 800*a*. In FIG. 8B, the flexible subband (or flexible subband resource(s)) 804 occupies a frequency portion of a subset of the uplink symbols in the time-frequency pattern 800*b*. In FIG. 8C, the flexible subband (or flexible subband resource(s)) 806 occupies a first frequency portion of a first subset of the uplink symbols in the time-frequency pattern 800*c*, while the flexible subband (or flexible subband resource(s)) 808 occupies a second frequency portion of a second subset of the uplink symbols in the time-frequency pattern 800*c*. The frequency positions and the sizes of the flexible subbands 806 and 808 are different.

Figure 9A:
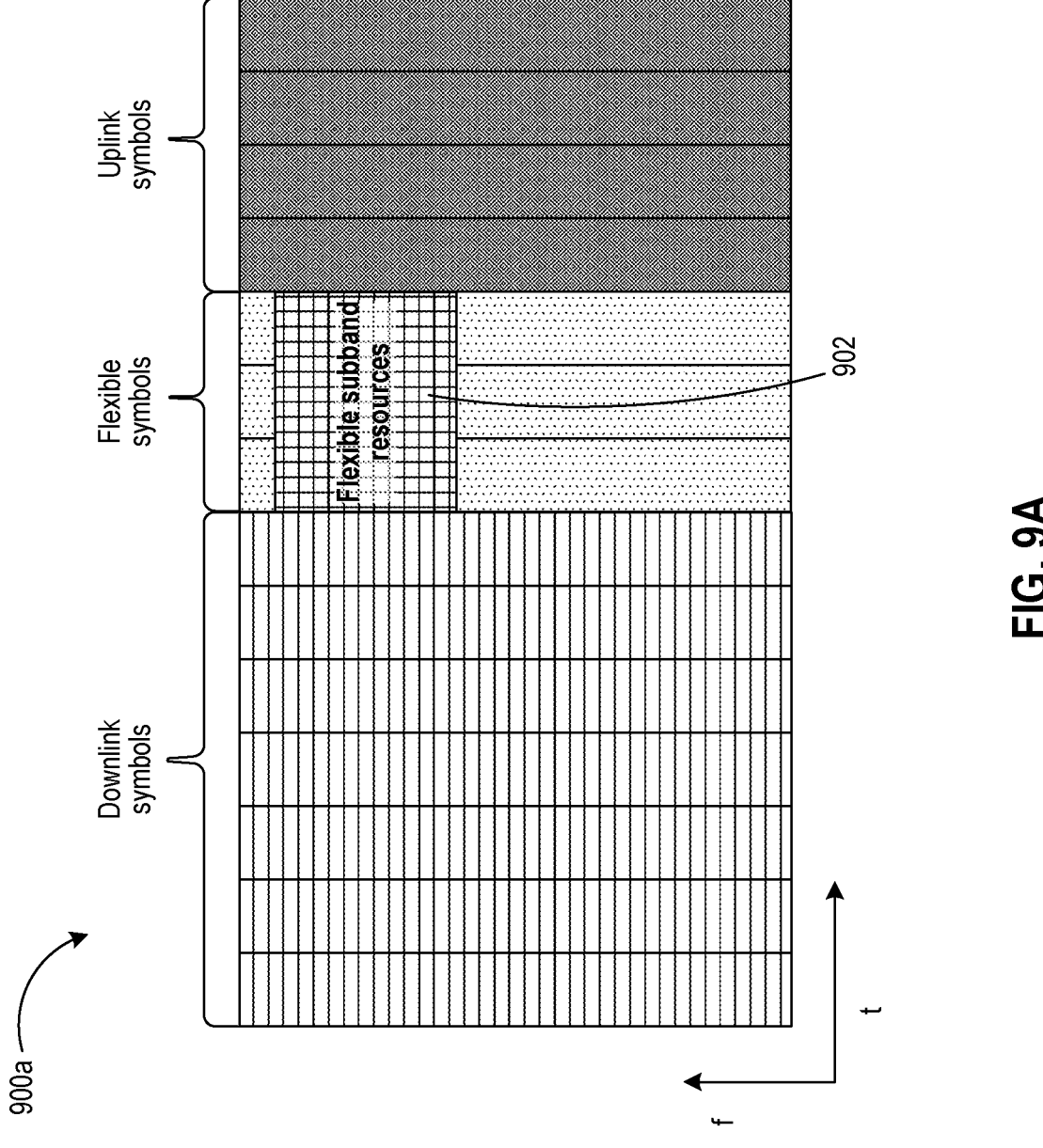
FIGS. 9A-9D shows other examples of flexible subband configuration schemes, according to example embodiments of the current disclosure.
Figure 9B:
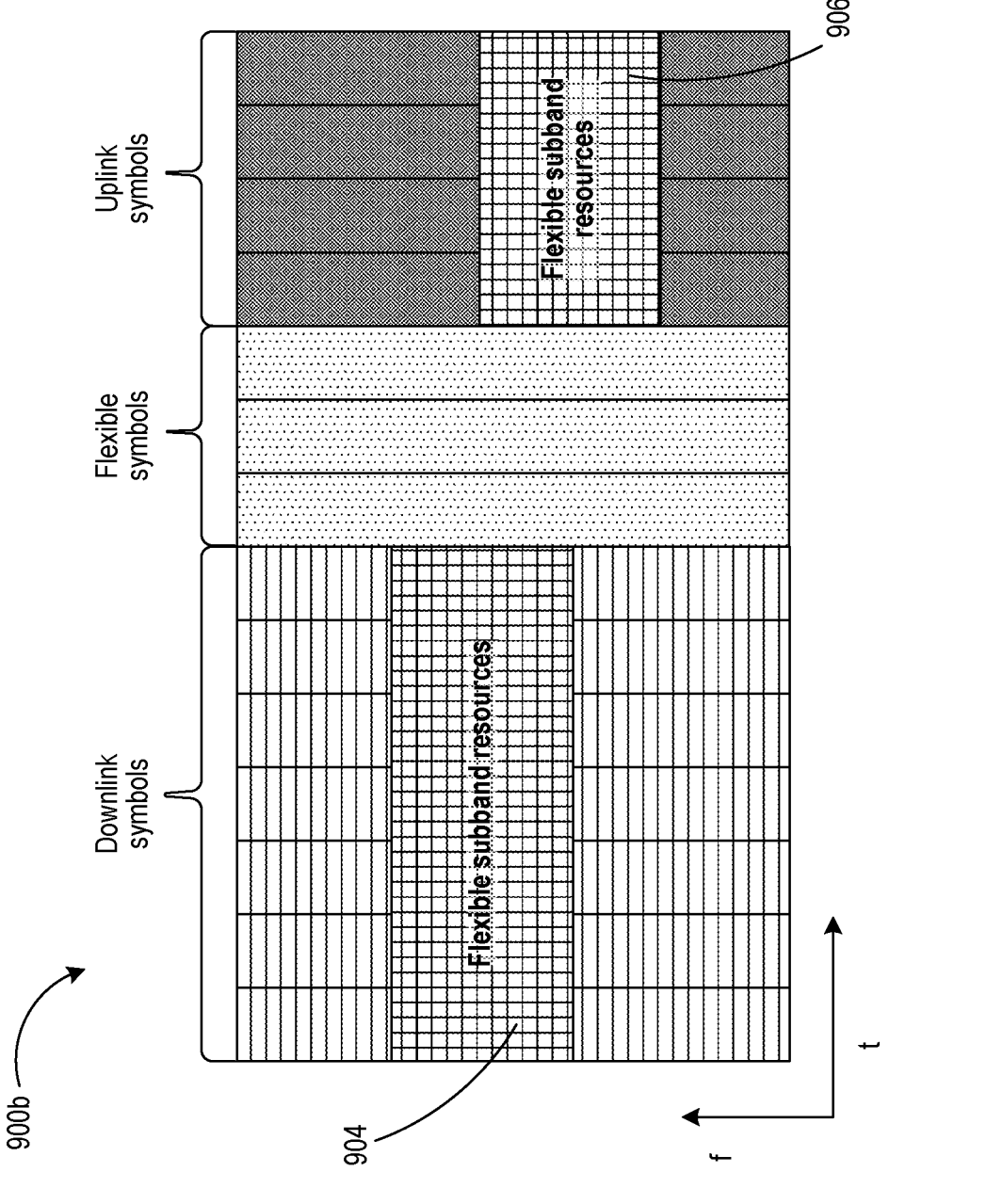

Referring now to FIGS. 9A-9D, various flexible subband configuration schemes or time-frequency patterns having flexible subbands that reside in different types of symbols are shown, according to example embodiments of the current disclosure. In FIG. 9A, the time-frequency pattern 900*a* depicts a single flexible subband 902 which occupies a frequency portion (or frequency interval) within all flexible symbols in the slot. In FIG. 9B, the time-frequency pattern 900*b* depicts two flexible subbands 904 and 906, where the frequency subband 904 occupies a frequency portion (or frequency interval) within all downlink symbols in the slot and the flexible subband 906 occupies a frequency portion (or frequency interval) within all uplink symbols in the slot. The frequency positions and the sizes of the flexible subband 904 and 906 are different.

Figure 9C:
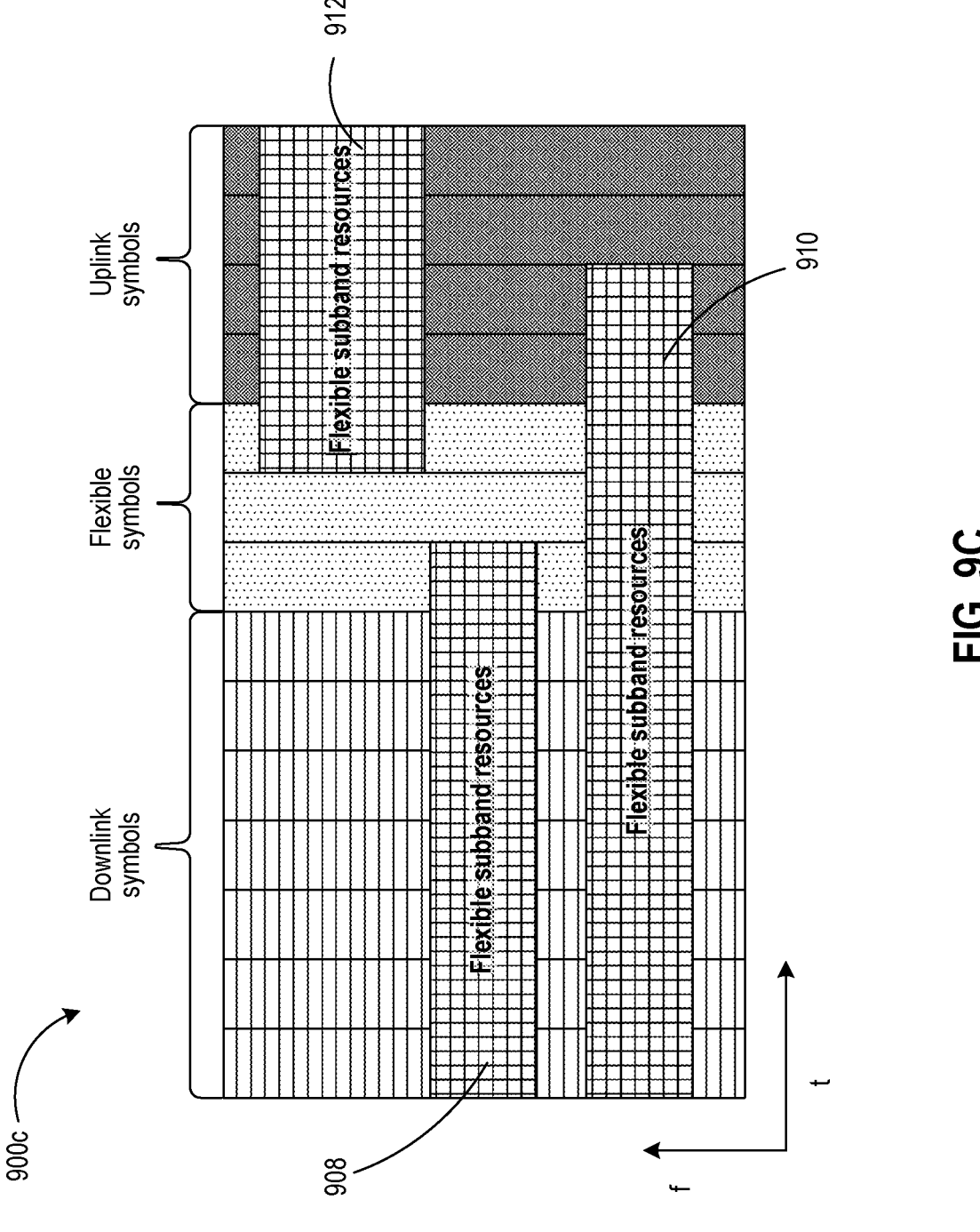

In FIG. 9C, the time-frequency pattern 900*c* depicts three flexible subbands 908, 910 and 912, where the flexible subband 908 occupies a frequency portion (or frequency interval) within all downlink symbols and a subset of flexible symbols in the slot. The flexible subband 910 occupies a frequency portion (or frequency interval) within all downlink symbols, all flexible symbols and a subset of uplink symbols in the slot. The flexible subband 912 occupies a frequency portion (or frequency interval) within a subset of flexible symbols and all uplink symbols in the slot. The flexible subbands 908, 910 and 912 have different frequency positions and different sizes.

Figure 9D:
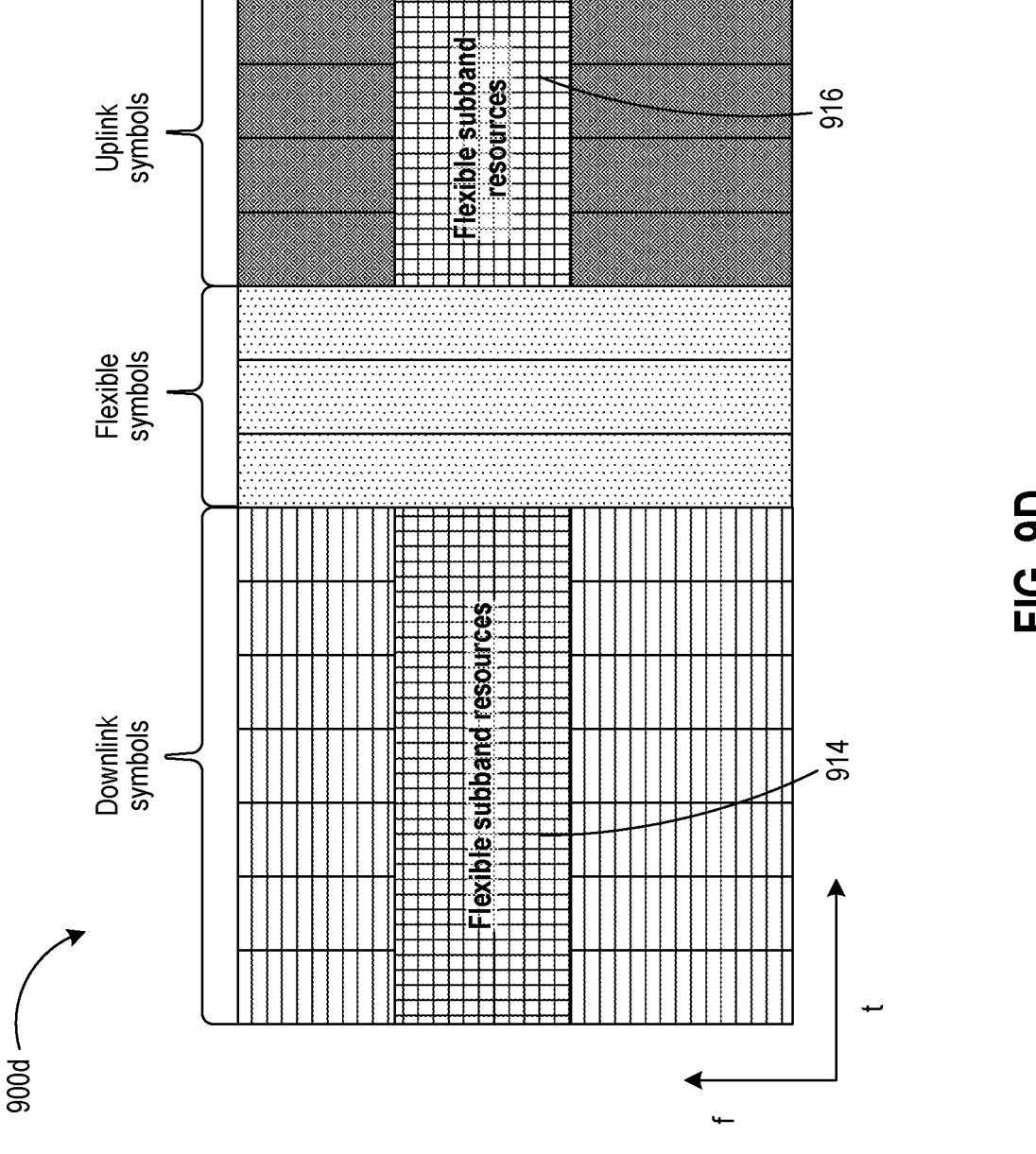

In FIG. 9D, the time-frequency pattern 900*d* depicts two flexible subbands 914 and 916, where the flexible subband 914 occupies a frequency portion (or frequency interval) within all downlink symbols in the slot and the flexible subband 916 occupies a frequency portion (or frequency interval) within all uplink symbols in the slot. The flexible subbands 914 and 916 have the same frequency position but different sizes (e.g., different lengths across the time axis). The flexible subbands 914 and 916 are located in non-consecutive symbols, and configuring these flexible subbands involves skipping (e.g., bypassing, not using or not including) flexible symbols of the slot.

In general, there are no strict requirements on the properties of skipped symbols. The properties of skipped symbols can be configured by the wireless communication node 102 or 202 or agreed upon between the wireless communication node 102 or 202 and the wireless communication device 104 or 204. In some implementations, when flexible subband resources are configured, downlink symbols can be skipped and the flexible subband resources can be allocated only to flexible symbols and uplink symbols. Alternatively, uplink symbols can be skipped and the flexible subband resources can be allocated only to downlink symbols and flexible symbols. In some other implementations, downlink symbols and uplink symbols can be skipped and the flexible subband resources can be allocated only to flexible symbols. In yet another implementation, flexible symbols and uplink symbols can skipped and only downlink symbols can be used to configure flexible subband resources. Alternatively, downlink symbols and flexible symbols can be skipped and only uplink symbols can be used to configure flexible subband resources.

In general, the skipped symbol(s) can include (i) at least one symbol that is each an uplink symbol, (ii) at least one symbol that is each a downlink symbol, (iii) at least one symbol that is each a flexible symbol, (iv) at least one symbol that is each an uplink or downlink symbol, (v) at least one symbol that is each a downlink or flexible symbol, (vi) at least one symbol that is each an uplink or flexible symbol, or (vii) at least one symbol that is reserved or used for one or more specific transmissions, such as symbols associated with cell common downlink or uplink signals/channels.

In some implementations, the wireless communication node 102 or 202 can use the flexible subband to allocate some resources in a carrier for transmission or reception for higher-level UEs without affecting (or changing) the transmission and reception of ordinary UEs in the carrier. Ordinary UEs can recognize the flexible subband and determine that there will be no data transmission and reception in the flexible subband. Higher-level UEs, on the other hand, can support transmission and reception in the flexible subband. The wireless communication node 102 or 202 can configure the flexible subband in the carrier. In this way, ordinary UEs do not transmit and receive in the flexible subband, but higher-level UEs transmit and receive data in the flexible subband.

The wireless communication node 102 or 202 can configure of the flexible subband resources as a common configuration at the cell level (e.g., cell specific configuration). In other words, the configuration can be for a cell and applies to wireless communication devices of the cell. For example, for a cell, at least one flexible subband resource can be configured common to UEs in the cell, and all UEs in the cell (e.g., except old UEs) can learn the configuration information of the flexible subband resource through the flexible subband. The wireless communication node 102 or 202 can transmit the configuration information of the flexible subband resource in the system broadcast message of the cell.

In some implementations, the configuration of the flexible subband resources can be UE-specific or at the UE-specific level. That is, the configuration can be specific to a given wireless communication device 104 or 204. For example, for one UE, at least one flexible subband resource can be configured. The UE-level configuration can be specific to multiple UEs. For example, the wireless communication node 102 or 202 can configure flexible subband resources for two or more UEs, and the configured flexible subband resources can be the same. The two or more UEs may not know that they are configured with the same flexible subband resources, because the configuration of the flexible subband resources is dedicated for each UE. For instance, the wireless communication node 102 or 2020 can determine another configuration for flexible subband resources that are same as the flexible subband resources configured in STEP 302 of FIG. 3. The other configuration can be specific to another wireless communication device 104 or 204. The wireless communication node 102 or 202 can send the other configuration to the other wireless communication device.

The wireless communication node 102 or 202 can dynamically configure or update the flexible subband resources based on signaling. For example, the wireless communication node 102 or 202 can configure or update a flexible subband resource for one UE or a group of UEs through parameters in the physical downlink control channel (PDCCH). The wireless communication node 102 or 202 may also configure or update the flexible subband resources for one UE or a group of UEs through radio resource control (RRC) signaling or multi-cell/multicast coordination entity (MCE) signaling.

Referring back to FIG. 3, in sending the configuration, the wireless communication node 102 or 202 can send to the wireless communication device 104 or 204 the configuration via at least one signaling (e.g., RRC or MAC-CE or DCI signaling). The configuration can indicate a number of symbols occupied by the flexible subband resources and positions of the symbols occupied by the flexible subband resources.

The following embodiments or implementations provide some examples of interoperability between the flexible subband and the downlink signal/channel.

According to a first case, the wireless communication node 102 or 202 can schedule downlink transmission of a signal or channel that is common to one or more wireless communication devices 104 or 204, using the flexible subband resources. The flexible subband resources can be used to transmit common downlink signals/channels at the cell level (including scheduled data/signaling based on a common PDCCH). The common downlink signals/channels can include but are not limited to the following channels/channels: synchronization signal block (SSB), CORESET #0, and CORESET for other common channels, various types of system information blocks, reference signals, such as demodulation reference signals (DMRS), various-purpose channel state information reference signal (CSI-RS), positioning reference signal, synchronization tracking reference signal, etc. The UE 104 or 204 can receive the cell-level common downlink signals/channels from the flexible subband resources, if the cell-level common downlink signals/channels are transmitted using the flexible subband resources.

According to the first case, the flexible subband resources may not be used to transmit UE-specific downlink dynamically scheduled data (e.g., data scheduled based on a UE-specific PDCCH). The wireless communication node 102 or 202 can determine not to transmit downlink scheduled data that is specific to the wireless communication device 104 or 204 using the flexible subband resources. That is, the UE 104 or 204 may not expect to receive UE-specific downlink dynamically scheduled data from the flexible subband resources. In other words, if a UE 104 or 204 is scheduled to receive UE-specific downlink dynamically scheduled data from the flexible subband resource, the UE 104 or 204 does not receive the data. In this way, if a resource in the flexible subband resource is allocated to the UE and used to transmit UE-specific downlink dynamically scheduled data, the UE will not receive data from this resource. In fact, the wireless communication node 102 or 202 will not transmit the data in the resource for the UE 104 or 204. But the wireless communication node 102 or 202 can use this resource for other purposes, such as transmitting data for a special or higher-level terminal, or keeping silent to avoid interference. This usage method will not affect the UE, because the UE will not receive data over the flexible subband resource.

In some implementations, the flexible subband resources can be used for semi-persistent scheduling (SPS) physical downlink shared channel (PDSCH). The SPS PDSCH can be transmitted based on the configured period without corresponding dynamic scheduling signaling. For example, if the UE is configured with an SPS configuration and its resources are configured in the flexible subband, then the UE shall receive the SPS configuration over the flexible subband. The SPS configuration is configured based on RRC signaling, and its configuration update is slow. To improve efficiency, if an SPS configuration is configured to use the resources of the flexible subband, the SPS configuration can be allowed to be transmitted in the flexible subband.

In some implementations, the resources used by the downlink common signal/channel in the flexible subband can be located in the downlink symbols or flexible symbols, and can even be located in the uplink symbols, if no uplink transmission is performed in the uplink symbols for UEs with half-duplex capability. The restriction does not apply to full-duplex capable UEs. If a resource is in the uplink symbol and in the flexible subband and is used to transmit UE-specific downlink dynamically scheduled data, the UE does not receive the data from that resource. In some implementations, if a flexible subband resource is used to transmit UE-specific downlink dynamically scheduled data, the UE does not receive the data from this resource. The wireless communication node 102 or 202 can schedule the downlink transmission of the signal or channel to one or more wireless communication devices, using at least one resource of the flexible subband resources. The at least one resource can be in at least one of a downlink symbol, a flexible symbol or an uplink symbol.

According to a second case, the wireless communication node 102 or 202 can determine to transmit downlink scheduled data that is specific to the wireless communication device using the flexible subband resources. In other words, the flexible subband resources can be used to transmit UE-specific downlink dynamically scheduled data. Further, if a flexible subband resource is used to transmit downlink dynamically scheduled data, the resource can be scheduled based on the configured time domain pattern. The time domain pattern can be configured by RRC signaling or dynamic signaling based on slot or symbol. For example, for a flexible subband, the wireless communication node 102 or 202 can configure a time-domain periodic pattern with one or more slots as the period, and in the slot corresponding to the time-domain pattern, (all or part of) resources of the flexible subband can be used for downlink dynamically scheduled data. However, for the slots outside the time domain pattern, the resources of the flexible subband cannot be used to transmit downlink dynamically scheduled data.

In some implementations, downlink dynamically scheduled data can use flexible subband resources in downlink symbols or can use flexible subband resources in flexible symbols. A resource allocated for downlink dynamically scheduled data can include resources from both non-flexible subbands and flexible subbands. The flexible subband resources in the uplink symbol may be used for a downlink dynamically scheduled data. For example, if there is no uplink transmission from other UEs in the uplink symbol, the flexible subband resources in the uplink symbol can be used for downlink dynamically scheduled data.

In some implementations, the wireless communication node 102 or 202 can determine not to schedule downlink transmission of a signal or channel that is common to one or more wireless communication devices 104 or 204, using the flexible subband resources. The flexible subband resources cannot be used to transmit common downlink signals/channels at the cell level. Generally, if there are legacy UEs, the flexible subband can be used to transmit a common downlink signal or channel at the cell level, which will not affect the legacy UEs to receive the common downlink signal/channel. However, the wireless communication node 102 or 202 can transmit common downlink signals/channels at the cell level in the flexible subband, if the wireless communication node 102 or 202 considers that the impact on legacy UEs is acceptable, or there are no legacy UEs in the cell.

In some implementations, the flexible subband resources in the flexible symbols can be used for both downlink transmission and uplink transmission. For example, the flexible subband resources in the flexible symbols can be used for downlink or uplink depending on the uplink or downlink properties of the indicated flexible symbols.

According to a third case, the wireless communication node 102 or 202 can determine to schedule or transmit downlink scheduled data that is specific to the wireless communication device and a signal or channel that is common to one or more wireless communication devices, using the flexible subband resources. The flexible subband resources can be used to transmit common downlink signals/channels at the cell level, and can also be used to transmit UE-specific dynamically scheduled downlink data. For example, the wireless communication node 102 or 202 can configure or schedule common downlink signals/channels to use the resources of the flexible subband according to the requirements, and the wireless communication node 102 or 202 can also configure or schedule the UE-specific and dynamically scheduled downlink data in the flexible subband according to the requirements. The wireless communication node 102 or 202 can also configure or schedule semi-static downlink transmissions to use the resources of the flexible subband. The requirement here means that when downlink transmission is performed in the flexible subband, no additional interference will be brought to other receiving ends, such as the aforementioned interference between the downlink and the uplink. If additional interference will occur, the resources of the flexible subband are not used for downlink transmission, otherwise the flexible subband can be used for downlink transmission (of various types). In this way, the function of the flexible subband is fully utilized. This process is very suitable for the situation where there are only new UEs in a cell, because the new UE can recognize the existence of the flexible subband and has the ability to receive data over the flexible subband, such as a full-duplex UE, half-duplex UE, etc.

In some implementations, the wireless communication node 102 or 202 can determine not to schedule or transmit any downlink signal or channel, using the flexible subband resources. The flexible subband resources cannot be used to transmit any downlink signals/channels. For example, if there is large interference between the uplink and downlink of a cell and a neighboring cell, then the wireless communication node 102 or 202 can configure the flexible subband in at least one cell to alleviate the interference. The wireless communication node 102 or 202 may not configure uplink or downlink in this flexible subband. As such, the flexible subband fulfills the role of its guard interval.

In some implementations, the wireless communication node 102 or 202 can receive from the wireless communication device 104 or 204 a signaling that is indicative of a capability of the wireless communication device 104 or 204 to support downlink communication using the flexible subband resources. A new signaling can be introduced to allow the UE to report support/unsupport for the use of the flexible subband resources. That is, the UE needs to report whether it has the ability to use the flexible subband resources. If the UE has this capability, the base station can schedule the UE to use the resources of the flexible subband. The wireless communication node 102 or 202 can prohibit scheduling the UE to use the resources of the flexible subband. For a UE that does not report this capability, the wireless communication node 102 or 202 cannot schedule the UE to use the flexible subband resources.

The following embodiments or implementations relate to some examples of interoperability between the flexible subband and the uplink signal/channel.

According to a first case, the wireless communication node 102 or 202 can schedule uplink transmission of a signal or channel that is common to one or more wireless communication devices, using the flexible subband resources. The flexible subband resources can be used to transmit common uplink signals/channels at the cell level (including scheduled data/signaling based on a common PDCCH). The common uplink signals/channels can include but are not limited to the following channels/channels: physical random access channel (PRACH), common physical uplink control channel (PUCCH) resources at the cell level, and reference signals such as DMRS or SRS. Its advantage is that if there are legacy UEs in the cell, and if the common uplink signal/channel at the cell level uses the flexible subband resource, then if the common uplink signal/channel is prohibited from using the flexible subband resource, it may lead to legacy UEs cannot receive/transmit the common uplink signal/channel in the flexible subband.

That is, the wireless communication node 102 or 202 can configure resources for transmitting the common uplink signal/channel from the flexible subband, and the wireless communication node 102 or 202 can also allocate resources for transmitting the common uplink signal/channel from the flexible subband for the UE. For the uplink initiated by the UE, such as PRACH, the UE can use the resources of the PRACH configured in the flexible subband. For example, when the UE needs to use the common PUCCH resources at the cell level (for example, in the random access process or when the UE is not configured with dedicated PUCCH resources), the wireless communication node 102 or 202 can instruct the common PUCCH resources configured in the flexible subband for the UE.

The wireless communication node 102 or 202 should receive the cell-level common uplink signals/channels from the flexible subband resources, if the cell-level common uplink signals/channels are transmitted using the flexible subband resources. That is, the common uplink signals/channels at the cell level can be transmitted using the flexible subband resources.

In some implementations, the wireless communication node 102 or 202 can determine not to transmit uplink scheduled data that is specific to the wireless communication device, using the flexible subband resources. The flexible subband resources cannot be used to transmit UE-specific uplink dynamically scheduled data (e.g., data scheduled based on a UE-specific PDCCH). That is, the UE does not expect to transmit UE-specific uplink dynamically scheduled data from the F subband resources. In other words, if a UE is scheduled to transmit UE-specific uplink dynamically scheduled data from the flexible subband resource, the UE does not transmit the data. In this way, if a resource in the F subband resource is allocated to the UE and used to transmit UE-specific uplink dynamically scheduled data, the UE will not transmit data from this resource. In fact, the base station will not receive the data in the resource. But the wireless communication node 102 or 202 can use this resource for other purposes, such as receiving data for a special or higher-level terminal, or keeping silent to avoid interference. This usage method will not affect the UE, because the UE will not transmit data from the resource.

In some implementations, the wireless communication node 102 or 202 can schedule transmission of a semi-static configured grant (CG) uplink channel (e.g., PUSCH), using the flexible subband resources, and transmit to the wireless communication device 104 or 204 a CG uplink channel configuration, via radio resource control (RRC) signaling using the flexible subband resources. The flexible subband resources can be used for uplink semi-static configuration grant (CG) PUSCH and/or semi-static PUCCH. The CG PUSCH is transmitted based on the configured period without corresponding dynamic scheduling signaling. For example, if the UE is configured with a CG PUSCH and its resources are configured in the flexible subband, then the UE shall transmit the CG PUSCH from the flexible subband. The CG PUSCH is configured based on RRC signaling, and its configuration update is slow. To improve efficiency, if a CG PUSCH is configured in the flexible subband, the UE should transmit the CG PUSCH in the F subband.

In some implementations, the semi-static PUCCH resource can be transmitted based on the configured period, and there is no corresponding dynamic scheduling signaling. If the UE is configured with a semi-static PUCCH resource for signal transmission, and its resources are configured in the flexible subband, the UE shall transmit the semi-static PUCCH from the flexible subband.

In some implementations, the wireless communication node 102 or 202 can schedule the uplink transmission of the signal or channel to one or more wireless communication devices, using at least one resource of the flexible subband resources. The at least one resource can include at least one of an uplink symbol, a flexible symbol or a downlink symbol. The resource used by the common uplink signal/channel in the flexible subband can be located in the uplink symbol or flexible symbol, or even in the downlink symbol (e.g., a downlink symbol when the wireless communication device has capability for full-duplex communication, or if no uplink transmission is scheduled on the downlink symbol when the wireless communication device has capability for half-duplex communication). If a resource is in the downlink symbol and in the flexible subband and is scheduled to transmit UE-specific uplink dynamically scheduled data, the UE does not transmit the data from that resource. In some implementations, if flexible subband resource is scheduled to transmit UE-specific uplink dynamically scheduled data, the UE does not transmit the data from the resource.

According to a second case, the wireless communication node 102 o 202 can determine to transmit uplink scheduled data that is specific to the wireless communication device, using the flexible subband resources. For the resources of the flexible subband, it can be used to transmit UE-specific uplink dynamically scheduled data. Further, if a resource in the F subband is used to transmit uplink dynamically scheduled data, the resource can be configure based on the configured time domain pattern. The time domain pattern is configured by RRC signaling or dynamic signaling based on slot or symbol. For example, for a flexible subband, the base station configures a time-domain periodic pattern with one or more slots as the period. In the slot corresponding to the time-domain pattern, (all or part of) resources of the F subband can be used for uplink dynamically scheduled data. However, for the slots outside the time domain pattern, the resources of the F subband cannot be used to transmit uplink dynamically scheduled data.

In some implementations, uplink dynamically scheduled data can use flexible subband resources in uplink symbols or can use F subband resources in flexible symbols. A resource allocated for uplink dynamically scheduled data can include resources from both non-flexible subbands and flexible subbands. In some instances, the flexible subband resources in the downlink symbol can be used for an uplink dynamically scheduled data. For example, if there is no downlink transmission from other UEs in the downlink symbol, the flexible subband resources in the downlink symbol can be used for uplink dynamically scheduled data.

In some implementations, the wireless communication node 102 or 202 can determine not to schedule uplink transmission of a signal or channel that is common to one or more wireless communication devices, using the flexible subband resources. The flexible subband resources cannot be used to transmit common uplink signals/channels at the cell level. However, the resources corresponding to the common uplink signal/channel at the cell level can be configured in the flexible subband, and the UE is configured to use the common uplink signal/channel, if the base station considers the impact of this to be acceptable.

In some implementations, the flexible subband resources in the flexible symbols can be used for both downlink transmission and uplink transmission. For example, the flexible subband resources in the flexible symbols can be used for downlink or uplink depending on the uplink or downlink properties of the indicated flexible symbols.

According to a third case, the wireless communication node 102 or 202 can determine to schedule or transmit uplink scheduled data that is specific to the wireless communication device, and a signal or channel that is common to one or more wireless communication devices, using the flexible subband resources. The flexible subband resources can be used to transmit common uplink signals/channels at the cell level, and can also be used to transmit UE-specific dynamically scheduled uplink data. For example, the wireless communication node 102 or 202 can configure or schedule common uplink signals/channels to use the resources of the flexible subband according to the requirements, and the base station can also configure or schedule the UE-specific dynamic scheduling uplink data in the flexible subband according to the requirements. The wireless communication node 102 or 202 can also configure or schedule semi-static uplink transmissions to use the resources of the flexible subband. The requirement here means that when uplink transmission is performed in the flexible subband, no additional interference will be brought to other receiving ends, such as the aforementioned interference between the uplink and the downlink. The resources of the flexible subband are not used for uplink transmissions if additional interference will occur, otherwise the flexible subband can be used for uplink transmissions (of various types). In this way, the function of the flexible subband is fully utilized. This process is very suitable for the situation where there are only new UEs in a cell, because the new UE can recognize the existence of the flexible subband and has the ability to receive data from the flexible subband, such as a full-duplex UE, half-duplex UE, etc.

In some implementations, the wireless communication node 102 or 202 can determine not to schedule or transmit any uplink signal or channel, using the flexible subband resources. The flexible subband resources cannot be used to transmit any uplink signals/channels. For example, if there is large interference between the uplink and downlink of a cell and a neighboring cell, then the wireless communication node 102 or 202 can configure the flexible subband in at least one cell to alleviate the interference. The wireless communication node 102 or 202 should also not configure uplink or downlink in this flexible subband. As such, the flexible subband fulfills the role of its guard interval.

In some implementations, the wireless communication node 102 or 202 can receive from the wireless communication device 104 or 204 a signaling that is indicative of a capability of the wireless communication device to support uplink communication using the flexible subband resources. A new signaling is introduced to allow the UE to report support/unsupport for the use of the flexible subband resources. That is, the UE needs to report whether it has the ability to use the flexible subband resources. If the UE has this capability, the base station can schedule the UE to use the resources of the F subband. Otherwise, the wireless communication node 102 or 202 can prohibit scheduling the UE to use the resources of the flexible subband. For a UE that does not report this capability, the wireless communication node 102 or 202 cannot schedule the UE to use the flexible subband resources.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein.

Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
determining, by a wireless communication node, a configuration for resources of a flexible subband in frequency domain in one carrier or cell; and
sending, by the wireless communication node to a wireless communication device, the configuration,
wherein the configuration indicates a time-frequency domain pattern of the resources of the flexible subband, the resources of the flexible subband comprising frequency domain resources in a plurality of symbols of at least one type of symbols, and
wherein a same resource in the flexible subband is usable for downlink transmission and is usable for uplink transmission, according to at least one of a condition or a scheduling.

2. The method of claim 1, comprising:
sending, by the wireless communication node to the wireless communication device, the configuration via at least one signaling, the configuration indicating a number of symbols occupied by the flexible subband, and positions of the symbols occupied by the flexible subband.

3. The method of claim 1, wherein the condition or the scheduling is a first condition or a first scheduling, wherein at least one of the resources of the flexible subband is:
not used for downlink transmission or uplink transmission, according to at least one of a second condition or a second scheduling.

4. The method of claim 1, comprising:
configuring, by the wireless communication node, flexible subband in a time domain slot, the time domain slot comprising one of:
a slot consisting of one or more downlink symbols,
a slot consisting of one or more uplink symbols,
a slot consisting of one or more flexible symbols,
a slot consisting of one or more downlink symbols and one or more uplink symbols, or
a slot comprising at least one of: a downlink symbol, an uplink symbol or a flexible symbol.

5. The method of claim 1, wherein the time-frequency domain pattern for the flexible subband, in a first period comprising at least one slot, is one of:
same as a time-frequency domain pattern for the flexible subband in a second period; or
different from the time-frequency domain pattern of the flexible subband resources in the second period.

6. The method of claim 1, comprising:
configuring, by the wireless communication node, a bandwidth of the flexible subband to be same as a bandwidth of one carrier or cell.

7. The method of claim 1, comprising:
configuring, by the wireless communication node, at least one of the flexible subband, to be positioned between at least one uplink resource on one side in frequency domain, and at least one downlink resource on another side in the frequency domain.

8. The method of claim 1, comprising:
configuring, by the wireless communication node, the flexible subband based on at least one of: a downlink symbol, an uplink symbol or a flexible symbol.

9. The method of claim 1, comprising:
configuring, by the wireless communication node, the flexible subband in consecutive or non-consecutive symbols of a slot.

10. The method of claim 9, comprising:
configuring, by the wireless communication node, the flexible subband to occupy a same frequency domain pattern in each of the consecutive or non-consecutive symbols.

11. The method of claim 1, comprising:
configuring, by the wireless communication node, the flexible subband to be in non-consecutive symbols, by skipping at least one symbols having at least one property.

12. The method of claim 11, wherein the at least one symbol having the at least one property comprises one of:
at least one symbol that is each an uplink symbol,
at least one symbol that is each a downlink symbol,
at least one symbol that is each a flexible symbol,
at least one symbol that is each an uplink or downlink symbol,
at least one symbol that is each a downlink or flexible symbol,
at least one symbol that is each an uplink or flexible symbol, or
at least one symbol that is reserved or used for one or more specific transmissions.

13. The method of claim 1, comprising:

configuring, by the wireless communication node, the flexible subband to be in all or a portion of: downlink symbols, uplink symbols, or flexible symbols, in a slot.

14. The method of claim 1, wherein the configuration is for a cell, and applies to wireless communication devices of the cell.

15. The method of claim 1, wherein the configuration is specific to the wireless communication device.

16. The method of claim 15, comprising:

determining, by the wireless communication node, another configuration for the resources of the flexible subband that are same as the resources of the flexible subband of the configuration, the another configuration being specific to another wireless communication device; and sending, by the wireless communication node to the another wireless communication device, the another configuration.

17. The method of claim 1, comprising:

scheduling, by the wireless communication node, downlink transmission of a signal or channel that is common to one or more wireless communication devices, using the flexible subband.

18. A method, comprising:

receiving, by a wireless communication device from a wireless communication node, a configuration for resources of a flexible subband in frequency domain in one carrier or cell, wherein the configuration indicates a time-frequency domain pattern of the resources of the flexible subband, the resources of the flexible subband comprising frequency domain resources in a plurality of symbols of at least one type of symbols, and wherein a same resource in the flexible subband is usable for downlink transmission and is usable for uplink transmission, according to at least one of a condition or a scheduling.

19. A wireless communication node, comprising:

at least one processor configured to:

determine a configuration for resources of a flexible subband in frequency domain in one carrier or cell; and send, via a transmitter to a wireless communication device, the configuration, wherein the configuration indicates a time-frequency domain pattern of the resources of the flexible subband, the resources of the flexible subband comprising frequency domain resources in a plurality of symbols of at least one type of symbols, and wherein a same resource in the flexible subband is usable for downlink transmission and is usable for uplink transmission, according to at least one of a condition or a scheduling.

20. A wireless communication device, comprising:

at least one processor configured to:

receive, via a receiver from a wireless communication node, a configuration for resources of a flexible subband in frequency domain in one carrier or cell, wherein the configuration indicates a time-frequency domain pattern of the resources of the flexible subband, the resources of the flexible subband comprising frequency domain resources in a plurality of symbols of at least one type of symbols, and wherein a same resource in the flexible subband is usable for downlink transmission and is usable for uplink transmission, according to at least one of a condition or a scheduling.

* * * * *